(12) United States Patent
Mishra et al.

(10) Patent No.: US 10,635,630 B2
(45) Date of Patent: Apr. 28, 2020

(54) FLEXIBLE PROTOCOL AND ASSOCIATED HARDWARE FOR ONE-WIRE RADIO FREQUENCY FRONT-END INTERFACE

(71) Applicant: QUALCOMM Incorporated, San Diego, CA (US)

(72) Inventors: Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/509,957

(22) Filed: Jul. 12, 2019

(65) Prior Publication Data

US 2020/0050575 A1   Feb. 13, 2020

Related U.S. Application Data

(60) Provisional application No. 62/716,646, filed on Aug. 9, 2018.

(51) Int. Cl.
*G06F 13/42* (2006.01)
(52) U.S. Cl.
CPC .. *G06F 13/4282* (2013.01); *G06F 2213/0016* (2013.01)
(58) Field of Classification Search
None
See application file for complete search history.

(56) References Cited

U.S. PATENT DOCUMENTS

| | | | |
|---|---|---|---|
| 2009/0089118 A1* | 4/2009 | Kagan | G06Q 10/06 705/7.12 |
| 2012/0086345 A1* | 4/2012 | Tran | H05B 33/0845 315/158 |
| 2013/0246675 A1* | 9/2013 | Korpinen | G06F 13/42 710/110 |
| 2016/0179746 A1* | 6/2016 | Hein | G06F 13/4291 710/105 |
| 2018/0027630 A1* | 1/2018 | DeJonge | H05B 33/0815 315/86 |
| 2018/0226967 A1* | 8/2018 | Hammerschmidt | G05B 21/02 |
| 2018/0278195 A1* | 9/2018 | Fritz | H02P 27/085 |
| 2019/0207742 A1* | 7/2019 | Haroun | H03M 9/00 |

* cited by examiner

*Primary Examiner* — Hyun Nam
(74) *Attorney, Agent, or Firm* — Loza & Loza LLP

(57) ABSTRACT

Increased data rates over a serial bus are enabled without increasing clock frequency. A method performed at a device coupled to a serial datalink includes transmitting a one-bit sequence start condition over a data wire of a datalink, providing a command field in the pulse-width modulated datagram, where a first-transmitted bit of the command field identifies the datagram as a write command directed to a register located at address zero, and providing data in a third-transmitted bit and subsequently-transmitted bits of the command field to be written to the register located at address zero when a second-transmitted bit of the command field has a first value. The sequence start condition has a first edge that commences transmission of a pulse-width modulated datagram and a second edge that indicates an optimal sampling point in each bit period of the pulse-width modulated datagram.

30 Claims, 21 Drawing Sheets

FLEXIBLE PROTOCOL AND ASSOCIATED HARDWARE FOR ONE-WIRE RADIO FREQUENCY FRONT-END INTERFACE

PRIORITY

This application claims priority to and the benefit of U.S. Provisional Patent Application Ser. No. 62/716,646 filed in the U.S. Patent Office on Aug. 9, 2018, the entire content of this application being incorporated herein by reference as if fully set forth below in its entirety and for all applicable purposes.

TECHNICAL FIELD

The present disclosure relates generally to serial communication and, more particularly, to providing robust decoding of pulse width modulated signals with reduced receiver complexity.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or $I^2C$) serial interface and its derivatives and alternatives.

The Mobile Industry Processor Interface (MIPI) Alliance defines standards and protocols for the Improved Inter-Integrated Circuit (BC) serial interface, the Radio Frequency Front-End (RFFE) interface, the system power management interface (SPMI) and other interfaces. These interfaces may be used to connect processors, sensors and other peripherals, for example. In some interfaces, multiple bus masters are coupled to the serial bus such that two or more devices can serve as bus master for different types of messages transmitted on the serial bus. The RFFE interface defines a communication interface that can be for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links. The SPMI provides a hardware interface that may be implemented between baseband or application processors and peripheral components. In some instances, the SPMI is deployed to support power management operations within a device.

In many instances, a multi-drop serial bus may be provided to support large numbers of devices that implement complex applications. For example, mobile communication devices include numerous components that are expected to cooperate in order to support increasing levels of functionality. It can be expected that increases in data throughput will be required to accommodate demands generated by increasingly complex applications. It is typically impractical to continually increase data throughput solely by raising clock frequencies.

SUMMARY

Certain aspects of the disclosure relate to systems, apparatus, methods and techniques that can support increased data rates for a serial bus without increasing bus clock frequency and without modifying encoding of the data transmitted on the data line.

In various aspects of the disclosure, a method performed at a device coupled to a serial datalink includes transmitting a one-bit sequence start condition over a data wire of a datalink, the sequence start condition having a first edge that commences transmission of a pulse-width modulated datagram and a second edge that indicates an optimal sampling point in each bit period of the pulse-width modulated datagram, providing a command field in the pulse-width modulated datagram, where a first-transmitted bit of the command field identifies the datagram as a write command directed to a register located at address zero, providing data in a third-transmitted bit and subsequently-transmitted bits of the command field to be written to the register located at address zero when a second-transmitted bit of the command field has a first value, and providing a payload field comprising data to be written to a register located at an address provided in the third-transmitted bit and the subsequently-transmitted bits of the command field when the second-transmitted bit of the command field has a second value. The payload field may carry one or more bytes of data. The payload field may be transmitted after the command field when the second-transmitted bit of the command field has the second value.

In one aspect, the sequence start condition has a width that is different from a width of each pulse that encodes data in the pulse-width modulated datagram.

In certain aspects, the method includes providing a slave address in the pulse-width modulated datagram. The slave device may select one or more of a plurality of slave devices coupled to the data wire to receive the datagram. The method may include providing a power supply to the plurality of slave devices.

In certain aspects, the method includes reconfiguring the datalink for communication according to an RFFE protocol, and transmitting an RFFE datagram on the data wire of the datalink in accordance with timing provided by a clock signal transmitted on a clock line of the datalink. Reconfiguring the datalink may include enabling transmission of the clock signal, wherein transmission of the clock signal is suppressed during transmission of the pulse-width modulated datagram.

In various aspects of the disclosure, an apparatus has an interface circuit adapted to couple the apparatus to a wire of a serial link and a protocol controller. The protocol controller may be configured to provide a one-bit sequence start condition over a data wire of a datalink, the sequence start condition having a first edge that commences a pulse-width modulated datagram and a second edge that indicates an optimal sampling point in each bit period of the pulse-width modulated datagram, provide a command field in the pulse-width modulated datagram, where a first-transmitted bit of the command field identifies the datagram as a write command directed to a register located at address zero, provide data in a third-transmitted bit and subsequently-transmitted bits of the command field to be written to the register located at address zero when a second-transmitted bit of the command field has a first value, and provide a payload field comprising data to be written to a register located at an address provided in the third-transmitted bit and the subsequently-transmitted bits of the command field when the second-transmitted bit of the command field has a second value.

In various aspects of the disclosure, an apparatus includes means for transmitting a one-bit sequence start condition over a data wire of a datalink, the sequence start condition having a first edge that commences a pulse-width modulated datagram and a second edge that indicates an optimal sampling point in each bit period of the pulse-width modulated datagram, and means for providing fields in the pulse-width modulated datagram, including a command field that comprises a first-transmitted bit of the command field identifying the datagram as a write command directed to a register located at address zero. Data may be provided in a third-transmitted bit and subsequently-transmitted bits of the command field to be written to the register located at address zero when a second-transmitted bit of the command field has a first value. Data may be provided in a payload field comprising data to be written to a register located at an address provided in the third-transmitted bit and the subsequently-transmitted bits of the command field when the second-transmitted bit of the command field has a second value.

In various aspects of the disclosure, a processor-readable storage medium store code for transmitting a one-bit sequence start condition over a data wire of a datalink, the sequence start condition having a first edge that commences transmission of a pulse-width modulated datagram and a second edge that indicates an optimal sampling point in each bit period of the pulse-width modulated datagram, providing a command field in the pulse-width modulated datagram, where a first-transmitted bit of the command field identifies the datagram as a write command directed to a register located at address zero, providing data in a third-transmitted bit and subsequently-transmitted bits of the command field to be written to the register located at address zero when a second-transmitted bit of the command field has a first value, and providing a payload field comprising data to be written to a register located at an address provided in the third-transmitted bit and the subsequently-transmitted bits of the command field when the second-transmitted bit of the command field has a second value.

DETAILED DESCRIPTION

Figure 1:
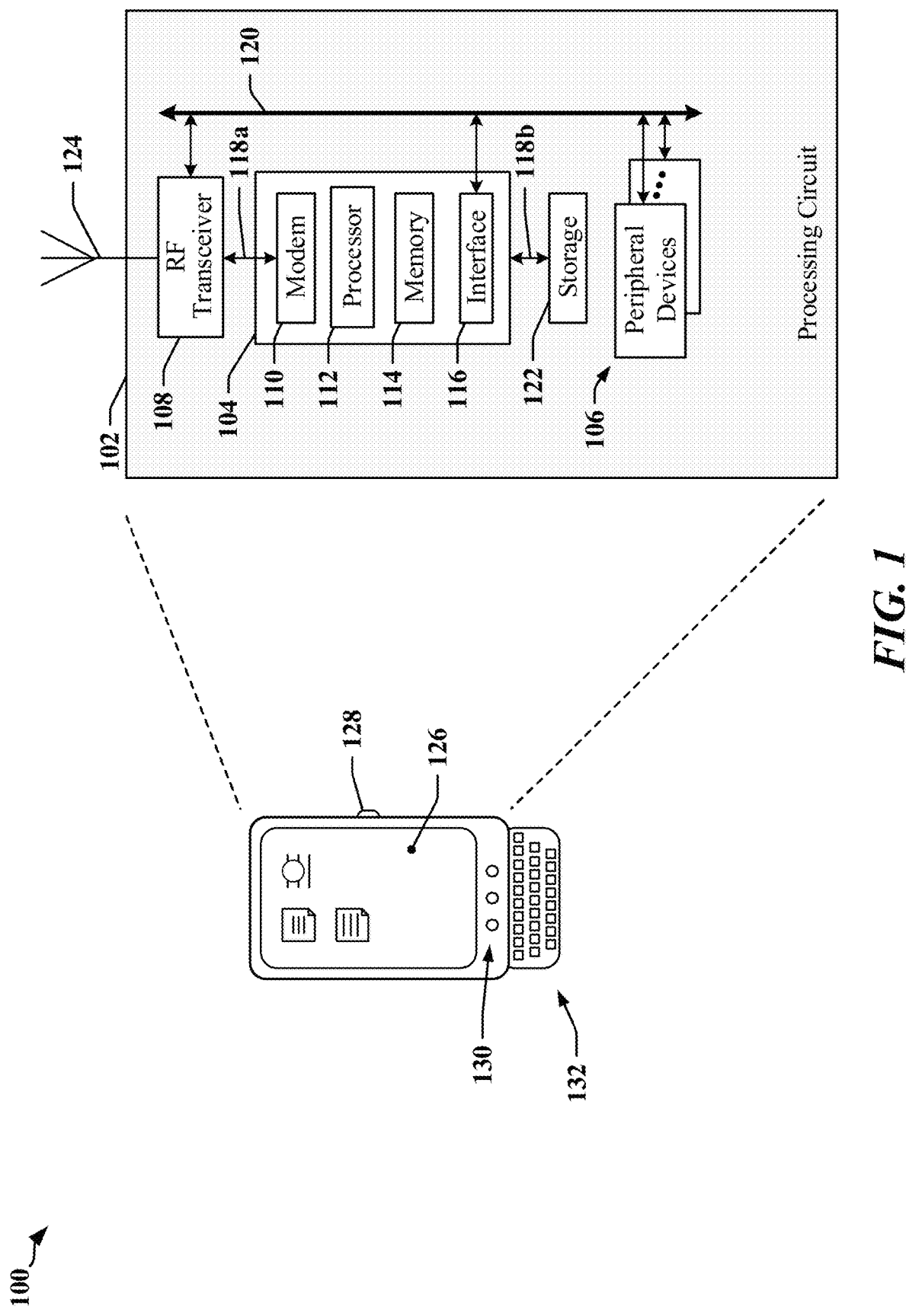
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. For example, the serial bus may be operated in accordance with an I2C, I3C, SPMI, and/or RFFE protocol, or other protocol that may be configured for half-duplex operation. Increased functionality and complexity of operations involving devices coupled to serial buses, together with the imposition of more stringent timing constraints in support of applications, peripherals and sensors can result in greater demand on general-purpose input/output (GPIO) and communication link throughput.

Certain aspects of the disclosure relate to techniques for communication over a single wire, using pulse-width modulation (PWM) to combine clock and data in the same signal. In one aspect, a method for optimizing a sampling clock at a receiver is enabled when a transmitter provides a transition at the mid-point of first bit interval in a PWM-encoded datagram.

An apparatus may have a protocol controller configured to provide a one-bit SSC over a data wire of a datalink, the SSC having a first edge that commences a pulse-width modulated datagram and a second edge that indicates an optimal sampling point in each bit period of the pulse-width modulated datagram. The protocol controller may be configured to provide a command field in the pulse-width modulated datagram where the first-transmitted bit of the command field identifies the datagram as a write command directed to a register located at address zero. The protocol controller may be configured to provide data in a third-transmitted bit and subsequently-transmitted bits of the command field to be written to the register located at address zero when a second-transmitted bit of the command field has a first value. The protocol controller may be configured to provide a payload field comprising data to be written to a register located at an address provided in the third-transmitted bit and the subsequently-transmitted bits of the command field when the second-transmitted bit of the command field has a second value.

Certain aspects disclosed herein may be useable to replace or supplement a serial bus protocol, such as an I2C, I3C, SPMI, and/or RFFE protocol, or point-to-point interfaces based on UARTs, line-multiplexed UARTs (LM-UARTs). Certain aspects are applicable to a serial bus operated in half-duplex mode or full-duplex mode. Certain aspects are applicable to point-to-point interfaces including UART-based interfaces, line multiplexed UART (LM-UART) interfaces. In some implementations, certain aspects disclosed herein may be deployed to support exchange of virtual GPIO (VGI) messages. Certain aspects are applicable to multipoint interfaces and/or interfaces operated in point-to-point mode.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
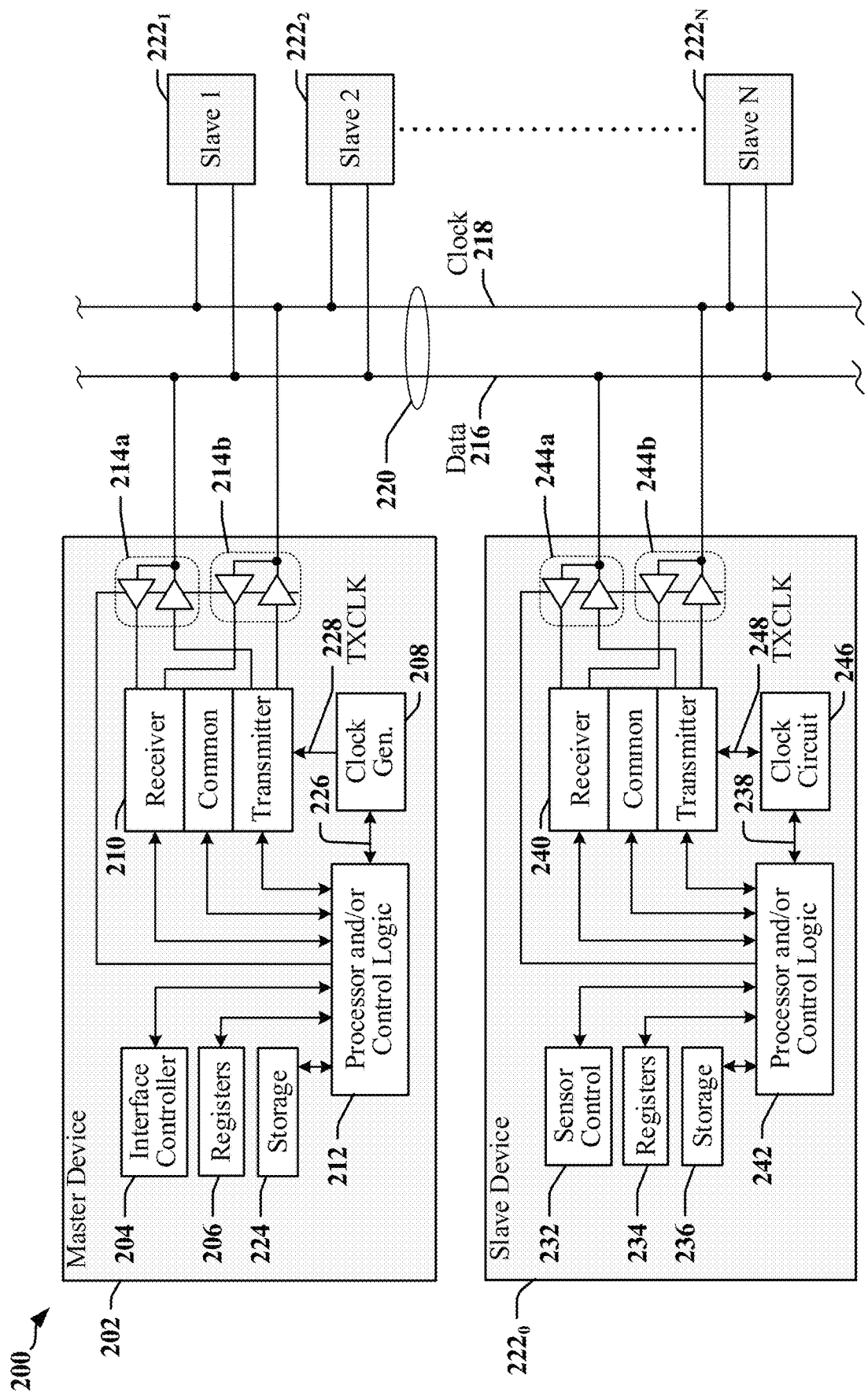
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an applications processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, RFFE devices, and/or other such components or devices. In some examples, one or more of the slave devices $222_0$-$222_N$ may be used to control, manage or monitor a sensor device. Communication between devices 202 and $222_0$-$222_N$ over the serial bus 220 is controlled by a master device 202. Certain types of bus can support multiple master devices 202.

In one example, a master device 202 may include an interface controller 204 that manages access to the serial bus, configures dynamic addresses for slave devices $222_0$-$222_N$ and/or causes a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device 222o configured to operate as a slave device may provide a control function, module or circuit 232 that includes circuits and modules to support a display, an image sensor, and/or circuits and modules that control and communicate with one or more sensors that measure environmental conditions. The slave device 222o may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with I2C, I3C, RFFE, SPMI, or another protocol. At least one device 202, $222_0$-$222_N$ may be configured to selectively operate as either a master device or a slave device on the serial bus 220. Two or more devices 202, $222_0$-$222_N$ may be configurable to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
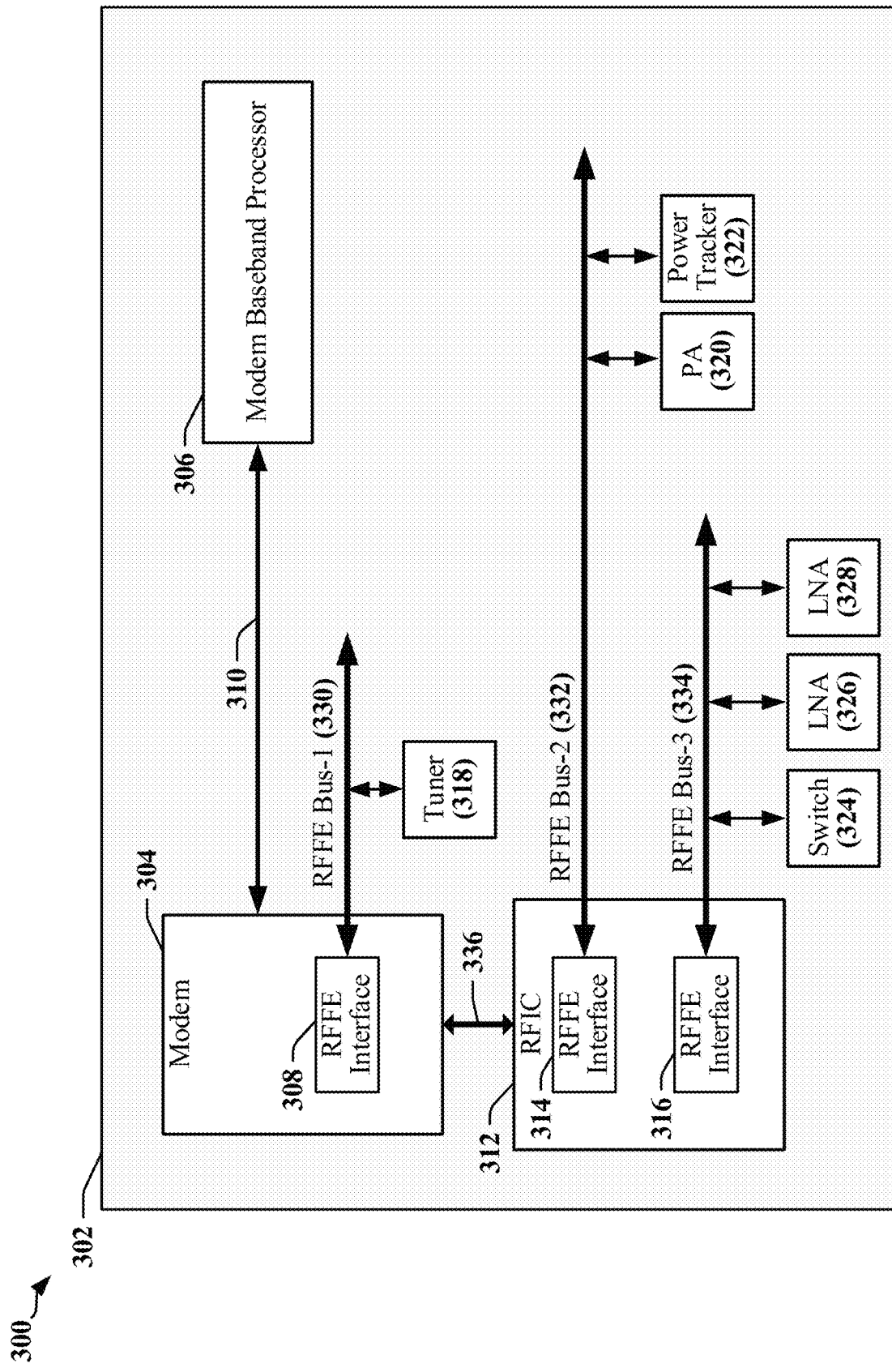
FIG. 3 illustrates a device configuration for coupling various radio frequency front-end devices using multiple RFFE buses.

FIG. 3 is a diagram 300 illustrating an example of a configuration of communication links in a chipset or device 302 that employs multiple RFFE buses 330, 332, 334 to couple various RF front-end devices 318, 320, 322, 324, 326 328. In this example, a modem 304 includes an RFFE interface 308 that couples the modem 304 to a first RFFE bus 330. The modem 304 may communicate with a baseband processor 306 and a Radio-Frequency IC (RFIC 312) through respective communication links 310, 336 or, in some implementations, through a common communication link 310 or 336. The illustrated device 302 may be embodied in one or more of a mobile communication device, a mobile telephone, a mobile computing system, a mobile telephone, a notebook computer, a tablet computing device, a media player, a gaming device, a wearable computing device, a wearable communication device, an appliance, or the like.

In various examples, the device 302 may be implemented with one or more baseband processors 306, modems 304, RFICs 312, multiple communication links 310, 336, multiple RFFE buses 330, 332, 334 and/or other types of buses. The device 302 may include other processors, circuits, modules and may be configured for various operations and/or different functionalities. In the example illustrated in FIG. 3, the modem 304 is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. In the illustrated example, the RFIC 312 communicates with a PA 320 and a power tracking module 322 through a first of its RFFE interfaces 314 and the second RFFE bus 332. In the illustrated example, RFIC 312 communicates with a switch 324 and one or more LNAs 326, 328 through a second of its RFFE interfaces 316 and the third RFFE bus 334.

Bus latency can affect the ability of a serial bus to handle high-priority, real-time and/or other time-constrained messages. Low-latency messages, or messages requiring low bus latency, may relate to sensor status, device-generated real-time events and virtualized GPIO. In one example, bus latency can be measured as the time elapsed between a message becoming available for transmission and the delivery of the message. In another example, bus latency can be measured as the time elapsed between a message becoming available for transmission and commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

Latency-sensitive messages carry or include coexistence messages. In one example, coexistence messages are transmitted in a multisystem platform to prevent or reduce instances of certain types of RFFE device impinging on each other. RFFE devices that may be the source or subject of coexistence messages include, for example, switches 324, LNAs 326, 328, PAs 320 and other types of device that operate concurrently in a manner that generates inter-device RF interference, and/or that could potentially cause damage to one or more devices. Coexistence management messages may be exchanged between certain devices that are shared between different radio access technologies, wireless subscriptions and/or applications. For example, a switch 324, LNA 326, 328, PA 320 and/or an antenna may be shared by two different radio access technologies which have different transmit and receive schedules, and damage to an LNA 326, 328 or other device may occur if a device begins transmitting using one radio access technology while receiving using another radio access technology. Devices that can interfere with one another may exchange coexistence management (CxM) messages to permit each device to signal imminent actions that may result in interference or conflict. For example, two modems 304 may exchange CxM messages in order to manage the operation of shared components. In conventional systems CxM messages may be exchanged using dedicated serial links, each implemented using a two-wire or four-wire Universal Asynchronous Receiver/Transmitter (UART). In multi-radio, multi-application systems, the CxM interconnects and other device interconnects can consume large numbers of physical input/output (I/O) pins and interconnects adding to cost and routing complexity.

In accordance with certain aspects disclosed herein, a multi-drop interface such as RFFE, SPMI, I3C, etc. can be used to reduce the number of physical I/O pins used to communicate between multiple devices by consolidating signaling onto a high-performance, low-latency serial bus. Protocols that support communication over a multi-drop serial bus define a datagram structure used to transmit command, control and data payloads within application-defined latency tolerances. Performance and latency of a serial bus may be determined to some degree by datagram structures defined by the protocols used to operate the serial bus. Datagram structures for different protocols define certain common features, including addressing used to select devices to receive or transmit data, clock generation and management, interrupt processing and device priorities.

Figure 4:
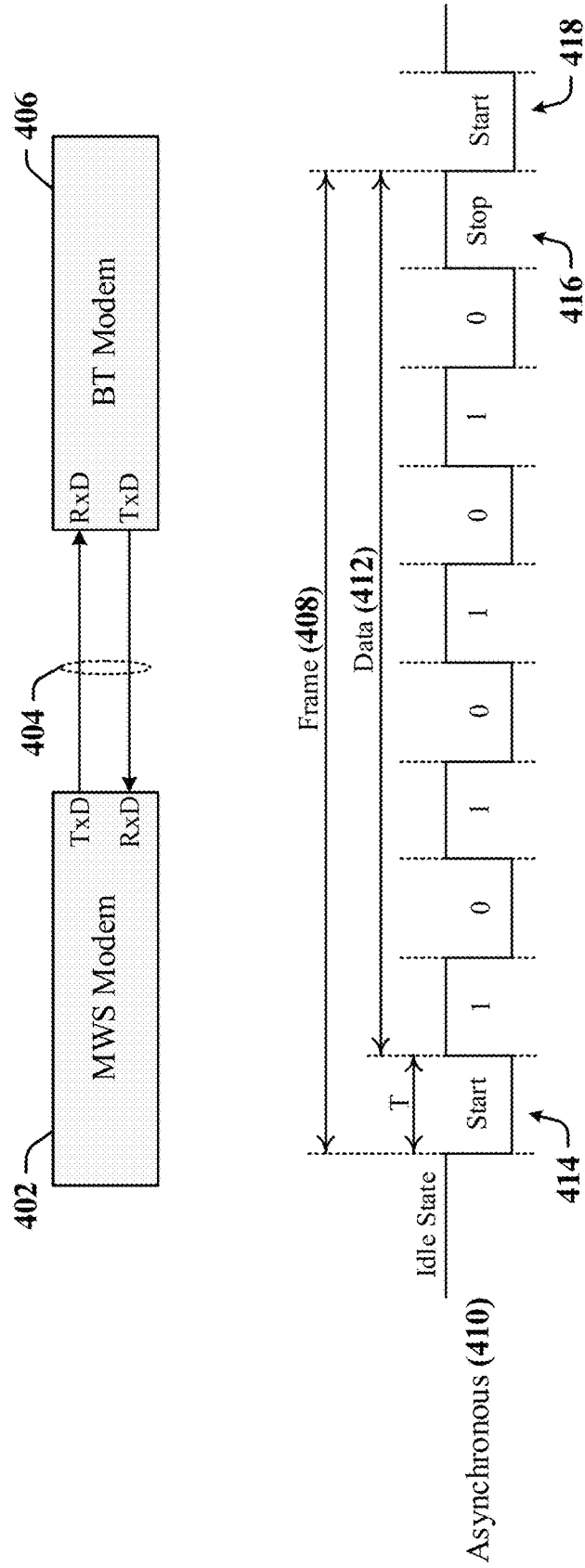
FIG. 4 illustrates an example of a system employing one or more coexistence management interfaces that may be adapted in accordance with certain aspects disclosed herein.

FIG. 4 illustrates an example of a coexistence management interface (CxMi) 400 that employs a point-to-point UART-based link. In one example, the link may be operated at 4 Mbps. In the example, a first modem 402 is configured for operation using a mobile wireless service (MWS) radio access technology and a second modem 406 is configured for Bluetooth (BT) communications. The modems 402, 406 exchange CxMi messages, commands and/or control information over a two-wire UART-based point-to-point CxMi link 404.

In one example, data is clocked on the CxMi link 404 at 4 megabits per second (Mbps). In the illustrated example, a frame 408 carried in a signal 410 transmitted over the CxMi link 404 includes an 8-bit byte of data 412 that is preceded by a start bit 414 and followed by a stop bit 416, and transmission is accomplished in 10 clock cycles, or 2.5 µs. The frame 408 may be followed immediately by the start bit 418 of a next frame or by an idle state.

According to certain aspects of this disclosure, protocols, such as the RFFE and SPMI protocols, and datagram structures defined by such protocols may be adapted for use in a one-wire bus. In some implementations, a one-wire bus may be operated using pulse-width modulation.

Figure 5:
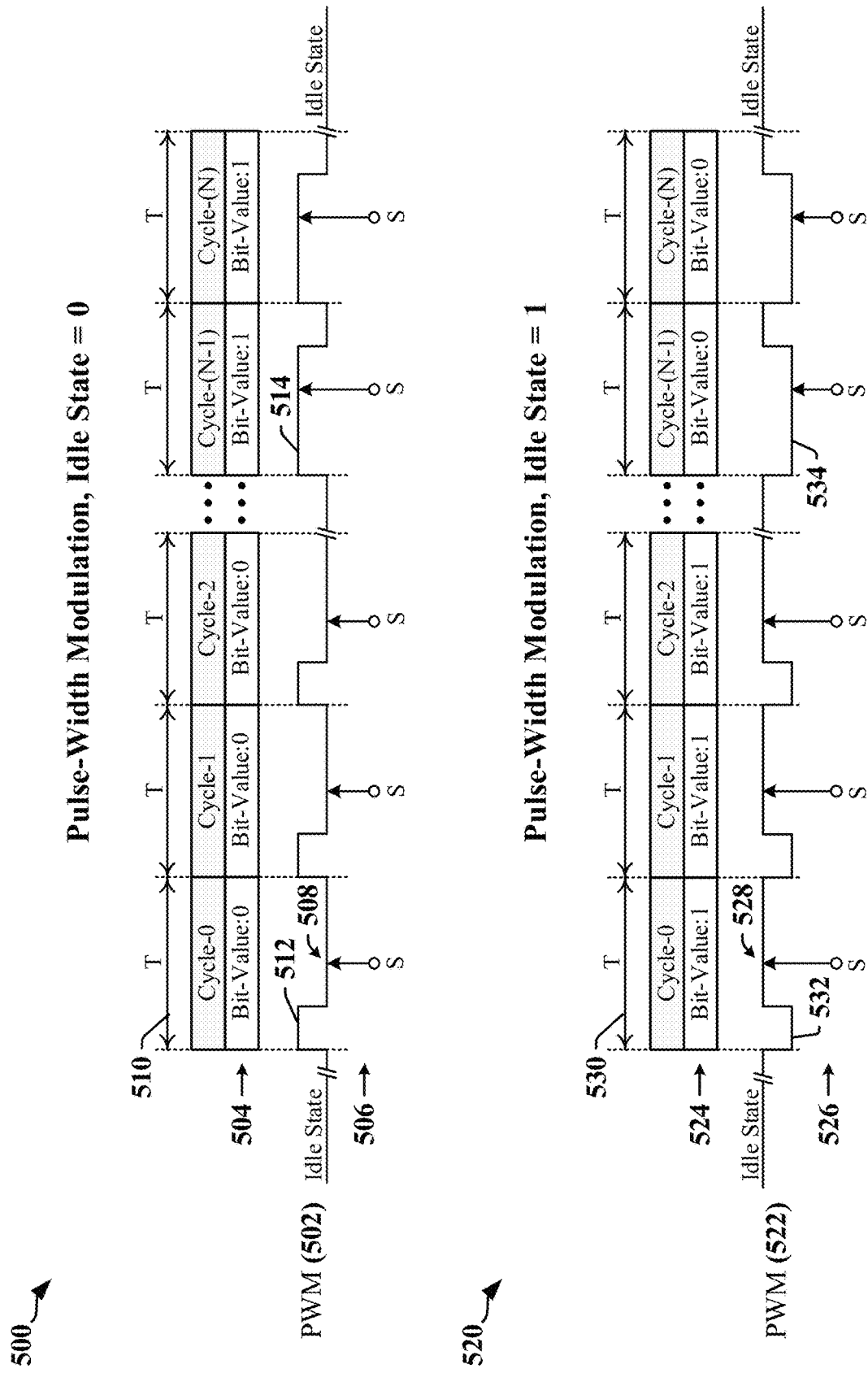
FIG. 5 illustrates modes of pulse-width modulation that may be adapted in accordance with certain aspects disclosed herein.

FIG. 5 illustrates two pulse-width modulation modes 500, 520. In the first pulse-width modulation mode 500, an idle state corresponding to logic-0 is defined, where logic-0 may be represented as a low, or zero-voltage state. Data is encoded in the width of pulses in a PWM signal 502 transmitted over a wire, where values of data bits 504 are encoded in the width of pulses 512, 514 transmitted in the PWM signal 502. In the example, a zero-bit value is represented as a short pulse 512, while a bit having the value '1' is represented as a long pulse 514. The short pulse 512 may be defined as a pulse that is less than half the transmission clock period 510, while the long pulse 514 may be defined as a pulse that is greater than half the transmission clock period 510. A receiver may capture data at sampling points 506 at or near the mid-point of each transmission clock period 510.

In the second pulse-width modulation mode 520, an idle state corresponding to logic-1 is defined, where logic-1 may be represented as a high, or positive-voltage state. Data is encoded in the width of pulses in a PWM signal 522 transmitted over a wire, where values of data bits 524 are encoded in the width of pulses 532, 534 transmitted in the PWM signal 522. In the example, a zero-bit value is represented as a short pulse 532, while a bit having the value '1' is represented as a long pulse 534. The short pulse 532 may be defined as a pulse that is less than half the transmission clock period 530, while the long pulse 534 may be defined as a pulse that is greater than half the transmission clock period 530. A receiver may capture data at sampling points 526 at or near the mid-point of each transmission clock period 530.

The PWM signals 502, 522 carry an embedded clock signal that can maintain immunity to DC-imbalance. In conventional serial data transmission interfaces, PWM signals 502, 522 may be used with clock signals up to 100 MHz. Conventional PWM interfaces are inherently limited to a maximum achievable speed and are associated with power and die-area penalties. These limitations may result from PWM decoding techniques that involve a mixed signal approach or a variety of digital techniques involving, for example, ring oscillators or over-sampling units to properly extract the transmitted bits. PWM encoding is imposed on the PWM signals 502, 522 from the first bit transmitted (Cycle-0). Timing related to the sampling is not explicitly provided in conventional PWM interfaces and the decoder circuit is required to compensate for variations and to correctly identify the optimal sampling point and/or the ideal sampling point 508, 528, which should occur at or near the ideal sampling point 508, 528 to enable robust decoding.

Certain aspects disclosed herein enable simplified decoding of PWM signals 502, 522 by including an optimal or ideal mid-point reference for data extraction at the commencement of the PWM signals 502, 522. In one example, the ideal mid-point reference is provided in Cycle-0.

Figure 6:
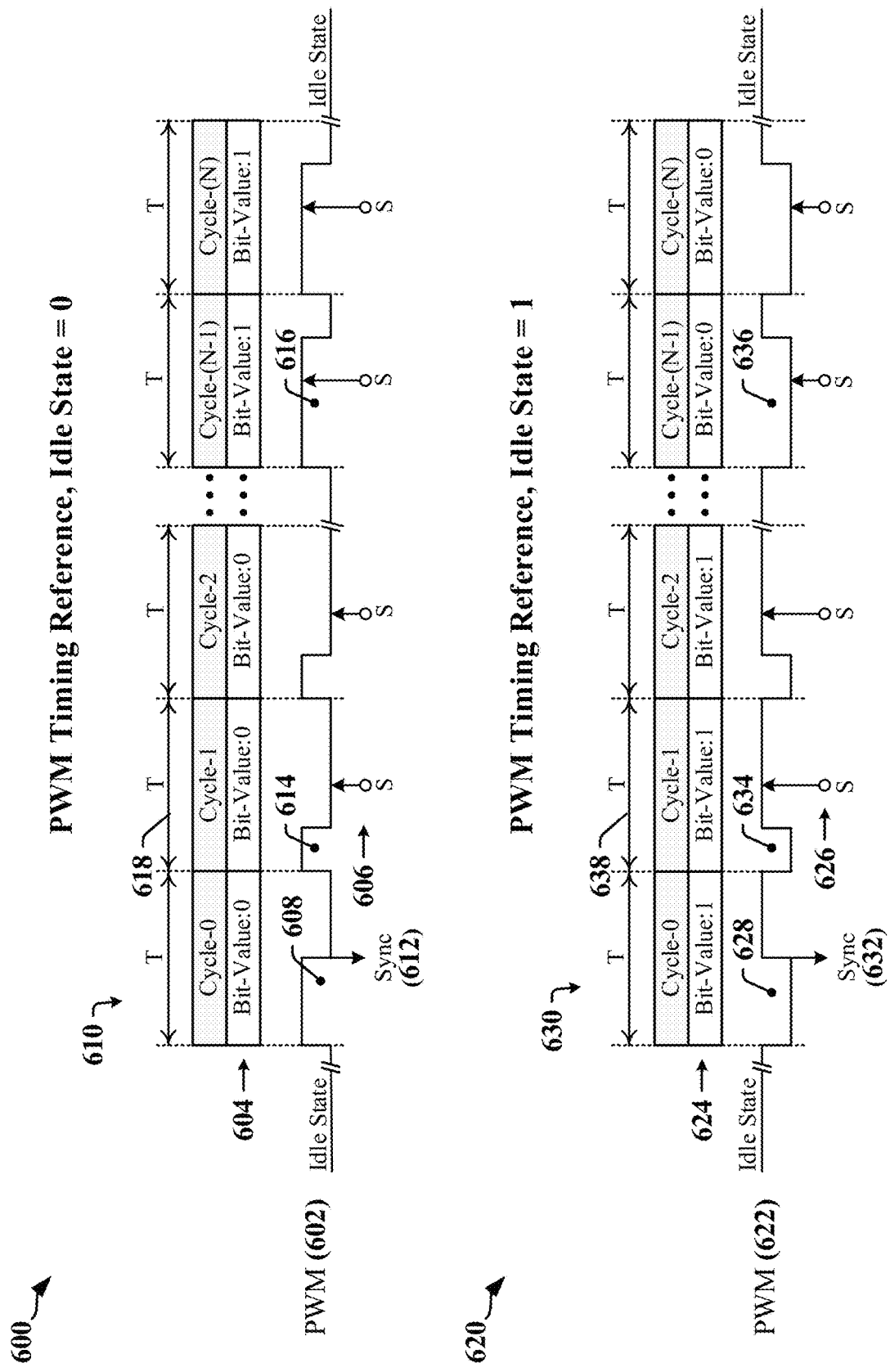
FIG. 6 illustrates pulse-width modulation in which an ideal or optimal bit sampling point is signaled according to certain aspects disclosed herein.

FIG. 6 illustrates two pulse-width modulation modes 600, 620 adapted according to certain aspects disclosed herein to transmit a pulse 608, 628 in the first bit period 610, 630 that has a 50% duty cycle. The pulse 608, 628 includes a transition 612, 632 at the mid-point of the first bit period 610, 630, where the transition 612, 632 provides explicit timing used to indicate the optimal sampling point and/or the ideal sampling point 606, 626 and/or generate sampling edges to be used for capturing PWM encoded data 604, 624.

In the first pulse-width modulation mode 600, an idle state corresponding to logic-0 is defined, where logic-0 may be represented as a low, or zero-voltage state. Data is encoded in the width of pulses in a PWM signal 602 transmitted over a wire, where values of bits of the data 604 are encoded in the width of pulses 614, 616 transmitted in the PWM signal 602. The pulses 614, 616 are provided by causing the PWM signal 602 to transition to a high voltage state for a duration of time referred to herein as pulse width. In the example, a zero-bit value is represented as a short pulse 614, while a bit having the value '1' is represented as a long pulse 616. The short pulse 614 may be defined as a pulse that is less than half the transmission clock period 618, while the long pulse 616 may be defined as a pulse that is greater than half the transmission clock period 618. A receiver may capture data at sampling points 606 in the middle of each transmission clock period 618, as identified by the ideal sampling point 606 indicated in the first bit period 610.

In the second pulse-width modulation mode 620, an idle state corresponding to logic-1 is defined, where logic-1 may be represented as a high, or positive-voltage state. Data is encoded in the width of pulses in a PWM signal 622 transmitted over a wire, where values of bits of the data 624 are encoded in the width of pulses 634, 636 transmitted in the PWM signal 622. The pulses 634, 636 are provided by causing the PWM signal 622 to transition to a low voltage state for a duration of time referred to herein as the pulse width. In the example, a zero-bit value is represented as a short pulse 634, while a bit having the value '1' is represented as a long pulse 636. The short pulse 634 may be defined as a pulse that is less than half the transmission clock period 638, while the long pulse 636 may be defined as a pulse that is greater than half the transmission clock period 638.

In accordance with certain aspects of this disclosure, a receiver may be configured to capture data at sampling points 626 in the middle of each transmission clock period 638. Optimal or ideal timing of the sampling points 626 may be indicated in the first bit period 630. In one example, a receiver may be configured to determine the ideal sampling points 606, 626 based on a transition 612, 632 provided at the mid-point of the first bit period 610, 630. Sampling at the ideal sampling points 606, 626 may be performed through hardware, software or some combination of hardware and software. A decoder may use the timing information provided by an initial sample timing reference extracted or derived from the first bit period 610, 630.

In certain implementations, the ideal sampling points 606, 626 may change between data frames. For example, consecutively transmitted data frames may be transmitted at different data rates, thereby causing the data frames to have different ideal sampling points 606, 626.

Certain aspects disclosed herein relate to the identification of end-of-frame for a PWM transmission. In a first example, End-of-Frame may be indicated when no transitions are detected on the data line for a defined or configured minimum time duration. In a second example, End-of-Frame may be determined by a receiver when the number of data bits received matches a signaled or configured number of transitions expected during the transmission.

Figure 7:
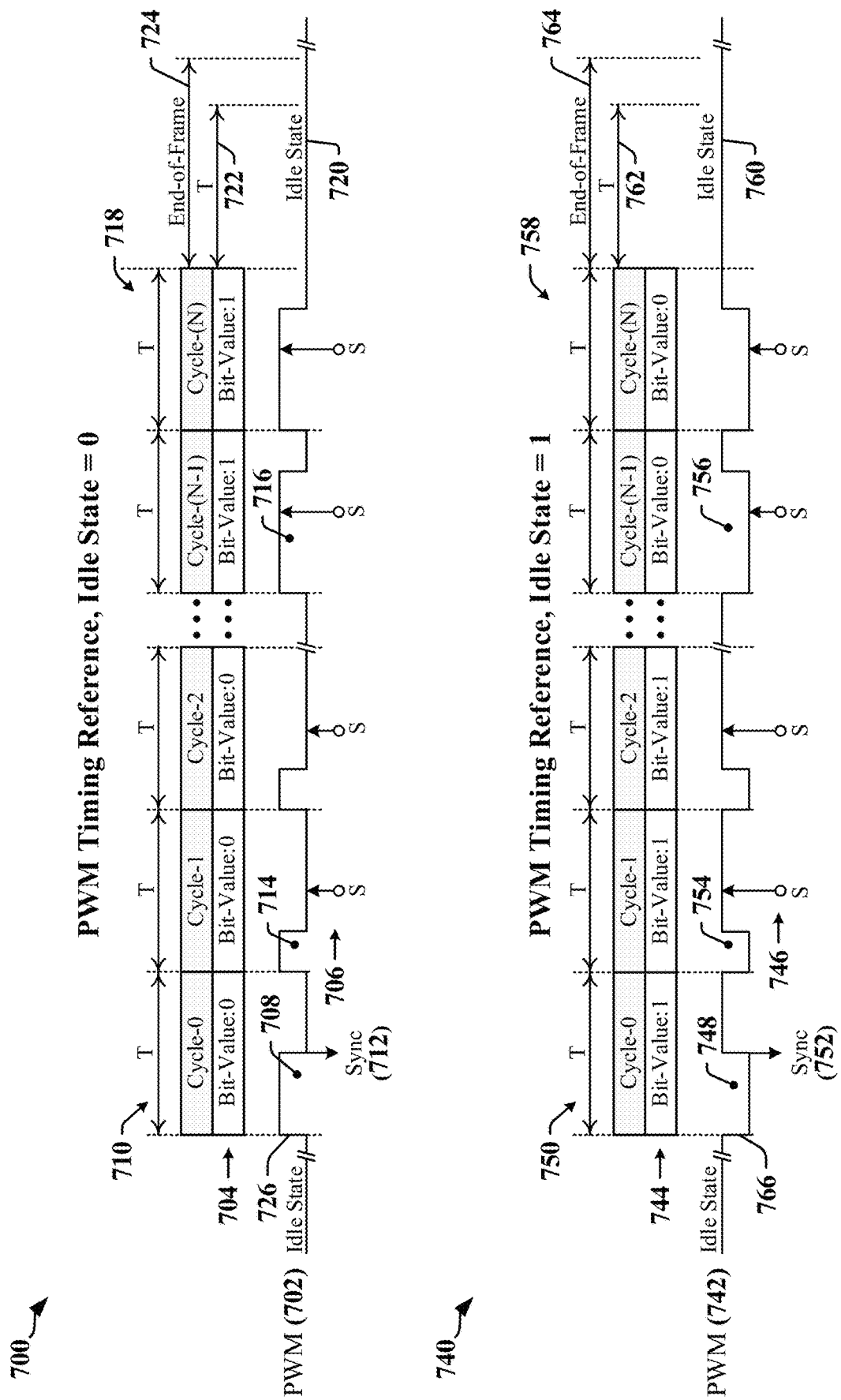
FIG. 7 illustrates pulse-width modulation in which an End-of-Frame condition is indicated by the duration of idle state according to certain aspects disclosed herein.

FIG. 7 illustrates two pulse-width modulation modes 700, 740 adapted according to certain aspects disclosed herein such that an End-of-Frame condition 724, 764 is indicated by the duration of the idle state 720, 760 following transmission of the last data bit 718, 758. In both pulse-width modulation modes 700, 740, a pulse 708, 748 transmitted in the first bit period 710, 750 has a 50% duty cycle. The pulse 708, 748 includes a transition 712, 752 at the mid-point of the first bit period 710, 750, where the transition 712, 752 provides explicit timing used to indicate the ideal sampling point 706, 746 and/or generate sampling edges to be used for capturing PWM encoded data 704, 744.

In the first pulse-width modulation mode 700, an idle state corresponding to logic-0 is defined, where logic-0 may be represented as a low, or zero-voltage state. Data is encoded in the width of pulses in a PWM signal 702 transmitted over a wire, where values of bits of the data 704 are encoded in the width of pulses 714, 716 transmitted in the PWM signal 702. The pulses 714, 716 are provided by causing the PWM signal 702 to transition to a high voltage state for a duration of time referred to herein as pulse width. In the example, a zero-bit value is represented as a short pulse 714, while a bit having the value '1' is represented as a long pulse 716. The short pulse 714 may be defined as a pulse that is less than half the transmission clock period, while the long pulse 716 may be defined as a pulse that is greater than half the transmission clock period. A receiver may capture data at sampling points 706 in the middle of each transmission clock period, as identified by the transition 712 at the mid-point of the first bit period 710.

The End-of-Frame condition 724 may be provided by the transmitter after the last data bit 718 has been transmitted. The transmitter may provide the End-of-Frame condition 724 by refraining from transmitting further data frames for a configured duration of time. In one example, the duration of the End-of-Frame condition 724 may be greater than a single bit time duration 722. In other examples, the End-of-Frame condition 724 may be greater than the duration of a long pulse 716 by a margin sufficient to enable a receiver to determine that no pulse has been transmitted after the last data bit 718.

In the second pulse-width modulation mode 740, an idle state corresponding to logic-1 is defined, where logic-1 may be represented as a high, or positive-voltage state. Data is encoded in the width of pulses in a PWM signal 742 transmitted over a wire, where values of bits of the data 744 are encoded in the width of pulses 754, 756 transmitted in the PWM signal 742. The pulses 754, 756 are provided by causing the PWM signal 742 to transition to a low voltage state for a duration of time referred to herein as pulse width. In the example, a zero-bit value is represented as a short pulse 754, while a bit having the value '1' is represented as a long pulse 756. The short pulse 754 may be defined as a pulse that is less than half the transmission clock period, while the long pulse 756 may be defined as a pulse that is greater than half the transmission clock period. A receiver may capture data at sampling points 746 in the middle of each transmission clock period, as identified by the transition 752 at the mid-point of the first bit period 750.

The End-of-Frame condition 764 may be provided by the transmitter after the last data bit 758 has been transmitted. The transmitter may provide the End-of-Frame condition 764 by refraining from transmitting further data frames for a configured duration of time. In one example, the duration of the End-of-Frame condition 764 may be greater than a single bit time duration 762. In other examples, the End-of-Frame condition 764 may be greater than the duration of a long pulse 756 by a margin sufficient to enable a receiver to determine that no pulse has been transmitted after the last data bit 758.

In some implementations, a transmitter may not provide an End-of-Frame condition 724, 764, and may begin transmitting a next data frame after the last data bit 718, 758 of a current frame has been transmitted. The number of bits to be transmitted may be known to the receiver by configuration or based on information provided in the frame. In one example, the receiver may be configured with information identifying a number of bits per frame, and the receiver may seek new or updated ideal sample timing in the first bit interval after determining that the last data bit 758 has been transmitted. In another example, the receiver may determine a number of bits per frame based on information carried in a header section of the frame.

Figure 8:
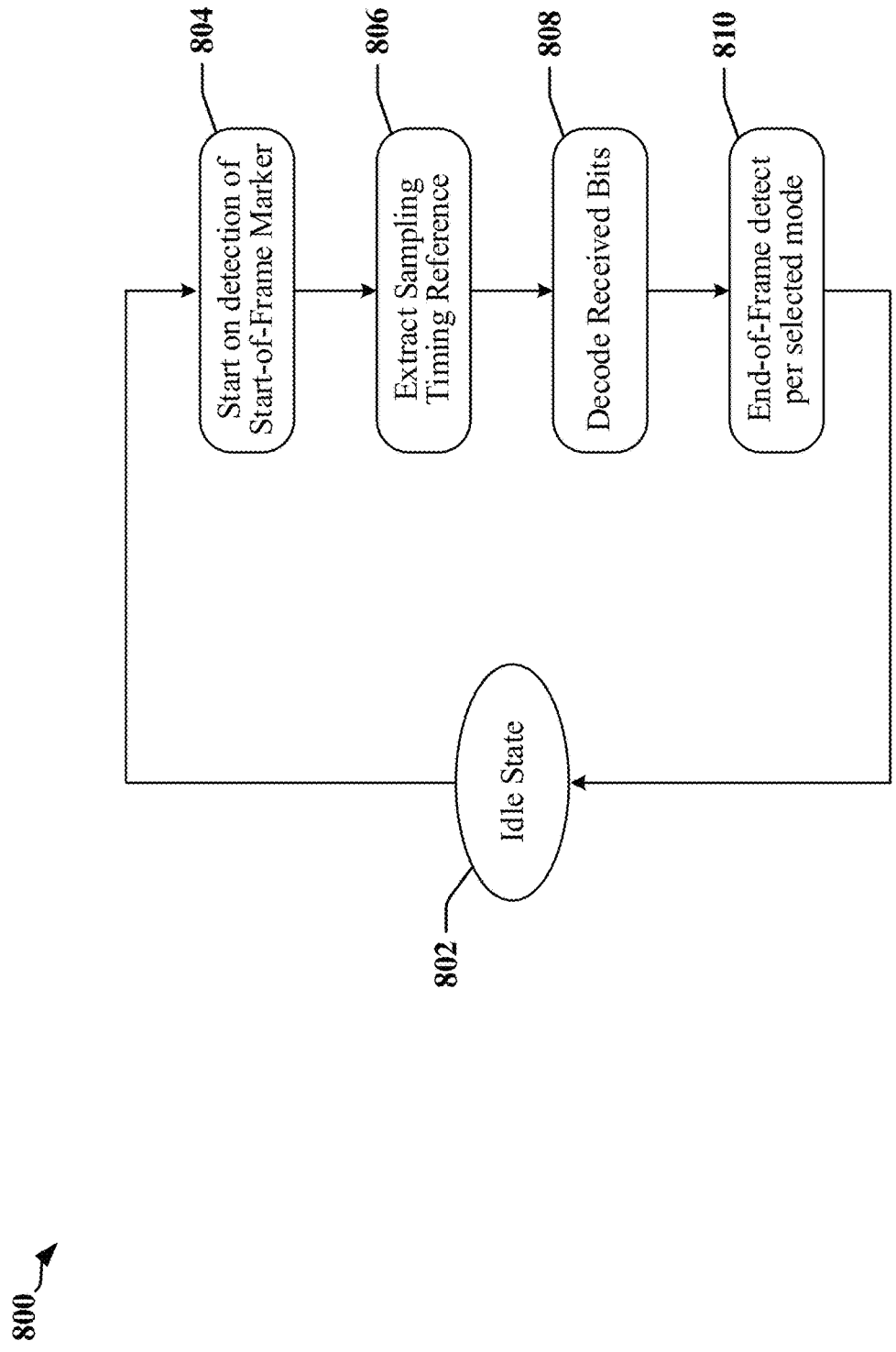
FIG. 8 illustrates decoding logic implemented at a receiver according to certain aspects disclosed herein.

FIG. 8 illustrates an example of decoding logic 800 that may be implemented at the receiver. Decoding may be performed by a state machine, controller or other type of processor. The PWM link may be initially in an idle state 802 when a Start-of-Frame marker is detected at block 804. In one example, the Start-of-Frame marker may be an initial transition 726, 766 that corresponds to the start of a pulse transmitted in a first bit period 710, 750 with a 50% duty cycle. Timing information may be extracted from the first bit period 710, 750 at block 806. In one example, the receiver may measure the time elapsed between the initial transition 726, 766 and the transition 712, 752 at the mid-point of the first bit period 710, 750 in order to determine the half-cycle, which may be used to derive sampling points 706, 746. At block 808, the receiver may sample and decode the bits of a received frame until an End-of-Frame condition is detected and/or identified at block 810. The PWM link may return to the idle state 802 after the End-of-Frame condition is detected and/or identified at block 810.

Figure 9:
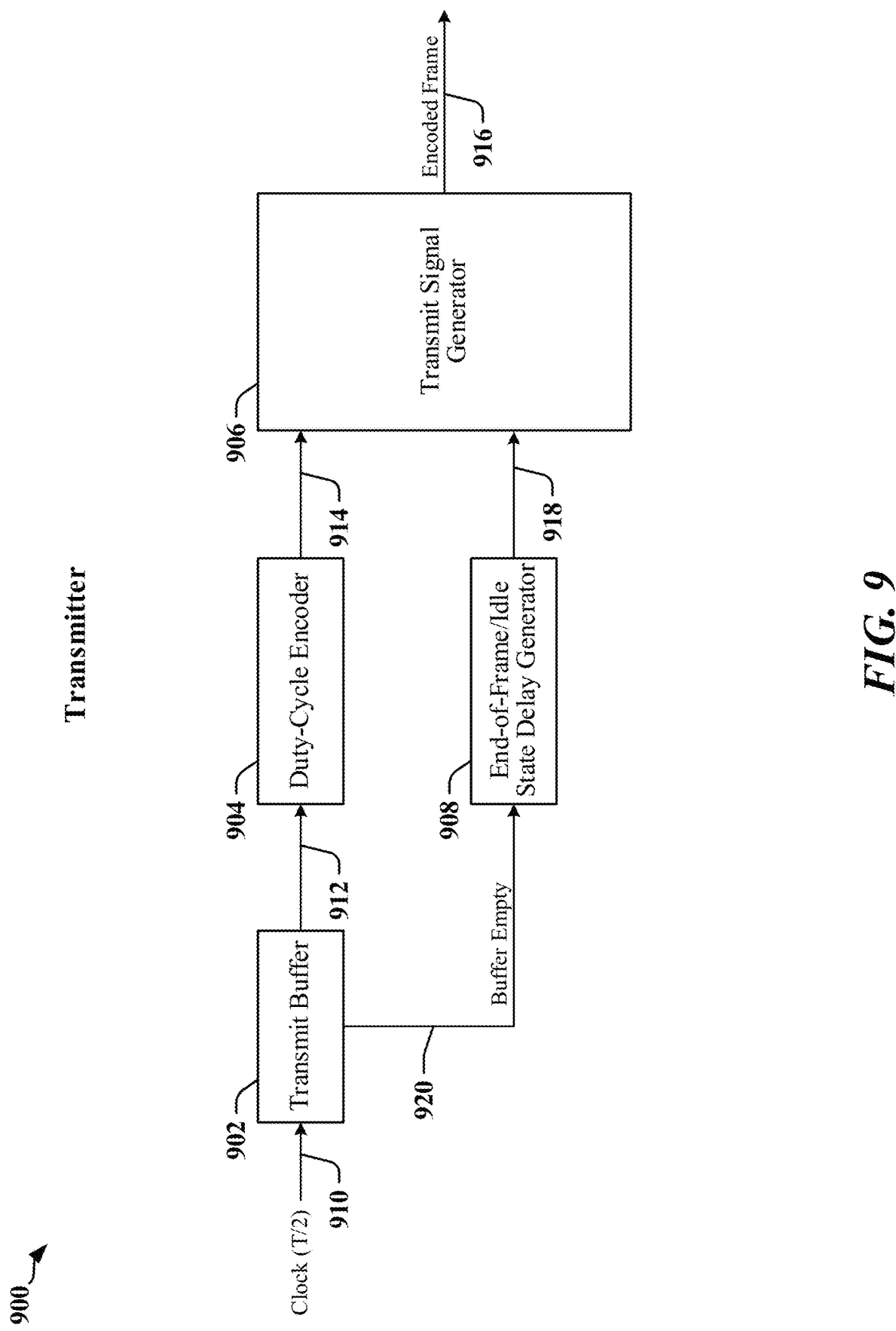
FIG. 9 illustrates a transmitter that transmits PWM-encoded frames in accordance with certain aspects disclosed herein.

FIG. 9 illustrates an example of a transmitter 900 that may be configured or adapted to transmit a PWM-encoded frame in accordance with certain aspects disclosed herein. Data for transmission may be provided to a transmit buffer 902, which provides a stream of serialized bits 912. In one example, data may be shifted from the transmit buffer 902 to an encoder 904 at a rate determined by a clock signal 910. In one example, the clock signal 910 has a period that is half the period (T/2) of the transmit clock that governs the bit time duration 722, 762. The encoder 904 may encode each bit of data in the duration of a pulse to be transmitted in a corresponding bit period. The encoder 904 may provide an encoded bitstream 914 to a transmission signal generator 906 that produces a signal 916 carrying the PWM-encoded frame.

The transmit buffer 902 may provide a Buffer Empty signal 920 to End-of-Frame logic 908. The Buffer Empty signal 920 indicates that no data is available for transmission. The End-of-Frame logic 908 may be configured to selectively cause transmissions of transitions on the wire to be suppressed for a configured duration of time. In one example, the End-of-Frame logic 908 may provide one or more control signals 918 that cause the transmission signal generator 906 to suppress the transitions. Suppression of transmission may be enabled for some modes of operation. In other modes of operation, the receiving device determines that an End-of-Frame condition exists based on the number of bits transmitted in the PWM-encoded frame.

Figure 10:
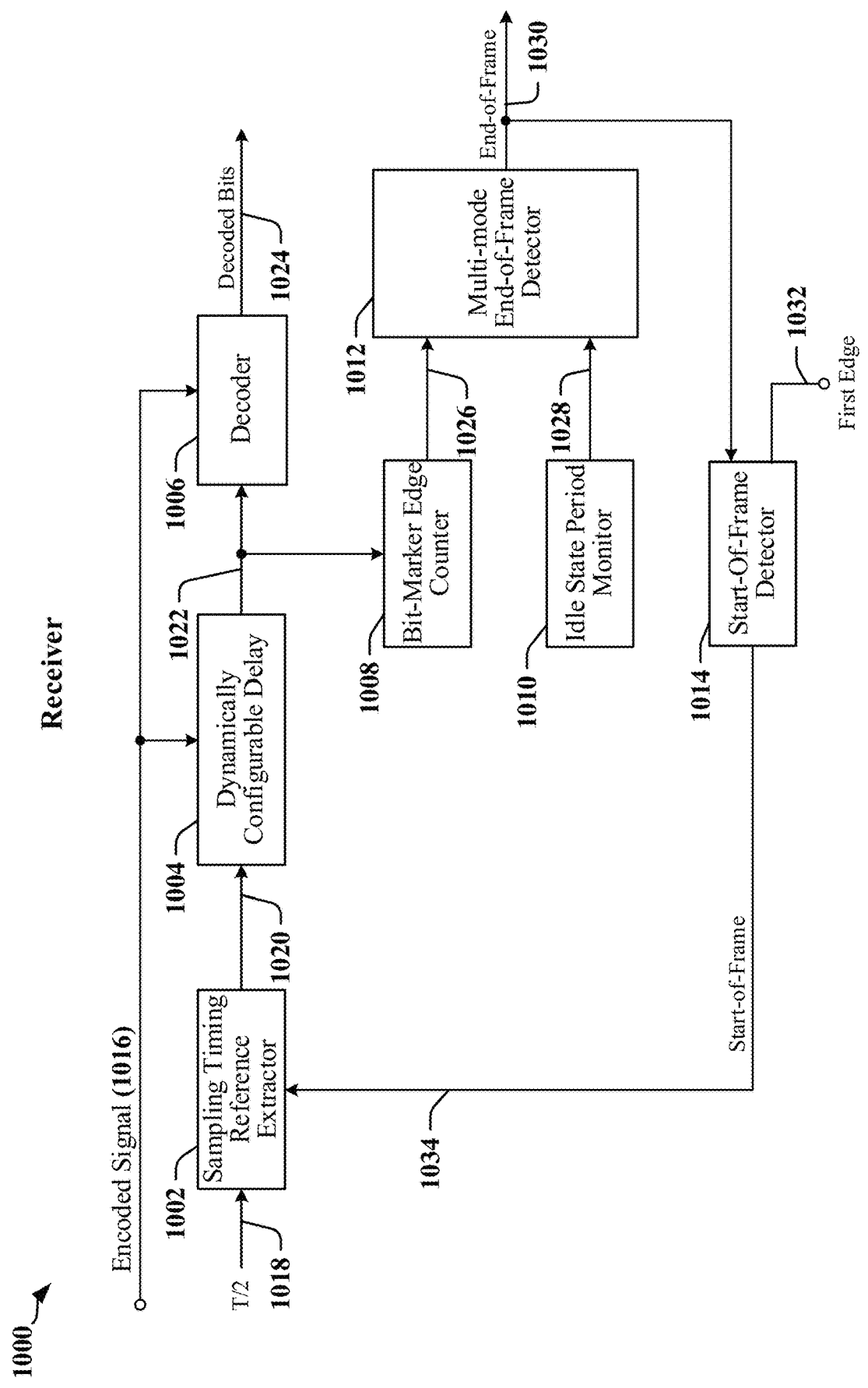
FIG. 10 illustrates an example of a receiver that receives PWM-encoded frames in accordance with certain aspects disclosed herein.

FIG. 10 illustrates an example of a receiver 1000 that may be configured or adapted in accordance with certain aspects disclosed herein. The receiver 1000 may include a PWM decoder 1006 that receives an encoded signal 1016 that carries a PWM-encoded frame. The PWM decoder 1006 may produce decoded data bits 1024 that may be deserialized and/or accumulated in a receive buffer (not shown). The PWM decoder 1006 receives a sampling signal 1022 that includes sampling edges used to capture bits from the encoded signal 1016. The sampling signal 1022 may be generated using a configurable delay circuit 1004 that delays the leading edge of each pulse to obtain edges that serve as sampling edges. The configurable delay circuit 1004 may be dynamically configured based on timing information 1020 provided by a sampling timing reference extractor 1002.

The sampling timing reference extractor 1002 may be configured to respond to the pulse 708, 748 transmitted in the first bit period 710, 750 of a frame, as illustrated in FIG. 7. The pulse 708, 748 may be configured with a duty cycle that causes a transition to occur at the ideal sampling point for the bits of the frame, which is typically the mid-point of the first bit period 710, 750. The sampling timing reference extractor 1002 receives an internally-generated clock signal 1018 and a Start-of-Frame indication 1034 that enables the sampling timing reference extractor 1002 to cause configuration of the configurable delay circuit 1004 during the first bit period 710, 750.

The configurable delay circuit 1004 may delay the encoded signal 1016 to obtain the sampling signal 1022. The sampling signal 1022 may be provided to a counter 1008 that counts edges in the sampling signal 1022. In one example, the counter 1008 records the number of edges used to sample the encoded signal 1016 in order to obtain a count of bits received from an encoded frame. In one example, the counter 1008 provides a signal 1026 that indicates a count value to an End-of-Frame detector 1012. In another example, the counter 1008 provides a signal 1026 that indicates when all expected bits of the frame have been received. The End-of-Frame detector 1012 may additionally or alternatively receive an idle signal 1028 from an idle state monitor 1010 indicating that the wire has been idle for a period that indicates an End-of-Frame condition. The End-of-Frame detector 1012 may be configurable for different modes of detection of End-of-Frame. In one mode, the End-of-Frame detector 1012 responds to the signal 1026 provided by the counter 1008 and, in a second mode the End-of-Frame detector 1012 responds to the idle signal 1028 provided by idle state monitor 1010.

The End-of-Frame detector 1012 may generate an End-of-Frame signal 1030 that may be used by upper-level protocols to arrange, configure and/or assemble the decoded data bits 1024. The End-of-Frame signal 1030 may also be provided to a Start-of-Frame detector 1014 that detects the first transition on the wire after an idle period. In one example, the End-of-Frame signal 1030 resets and/or primes the Start-of-Frame detector 1014. The Start-of-Frame detector 1014 may receive at an input 1032, the encoded signal 1016, or an input from an edge detector circuit that monitors the encoded signal 1016, or another signal indicating that a first bit period 710, 750 of a frame is being received. The Start-of-Frame detector 1014 may provide a Start-of-Frame indication 1034 that enables the sampling timing reference extractor 1002 to configure of the configurable delay circuit 1004 during the first bit period 710, 750.

Figure 11:
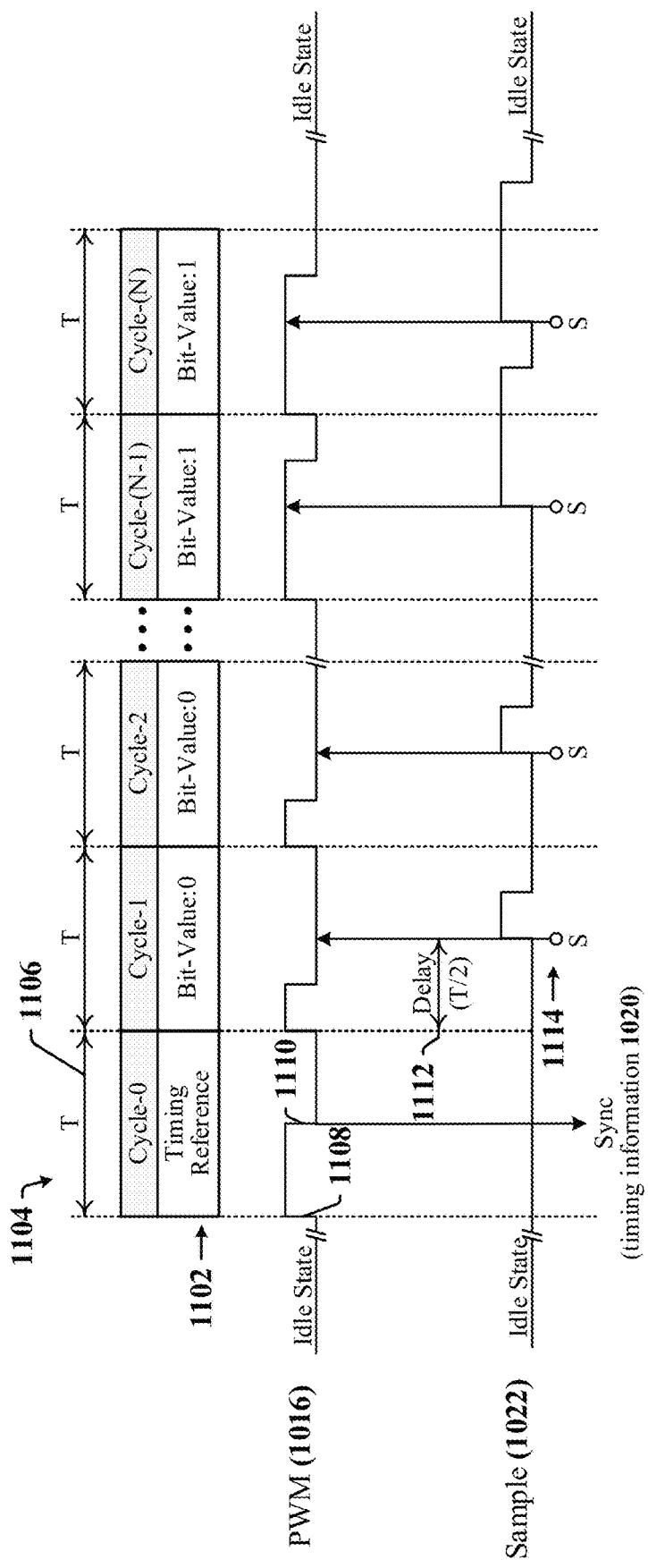
FIG. 11 illustrates timing associated with optimal or ideal sample clock generation in accordance with certain aspects disclosed herein.

FIG. 11 illustrates certain aspects of the timing 1100 associated with generating a sampling signal 1022 in accordance with certain aspects disclosed herein. The illustrated timing 1100 may correspond to timing of the circuits illustrated in FIG. 10. The sampling timing reference extractor 1002 may receive the encoded signal 1016, and may detect the leading edge 1108 of a pulse provided in the first bit interval 1104 of a frame 1102. The sampling timing reference extractor 1002 may then time the occurrence of the second edge 1110, which provides an indication of the location of an ideal sample point. In some implementations, the duration between the leading edge 1108 and the second edge 1110 corresponds to half the period 1106 of each bit interval in the encoded signal 1016. The sampling timing reference extractor 1002 may provide timing information 1020 used to configure a delay duration 1112 for the configurable delay circuit 1004. The configurable delay circuit 1004 may use the delay duration 1112 to obtain a delayed version of the encoded signal 1016, in which the leading edges indicate the sample points 1114 used to capture bits from the encoded signal 1016.

Protocols for Single Wire Datalinks

Figure 12:
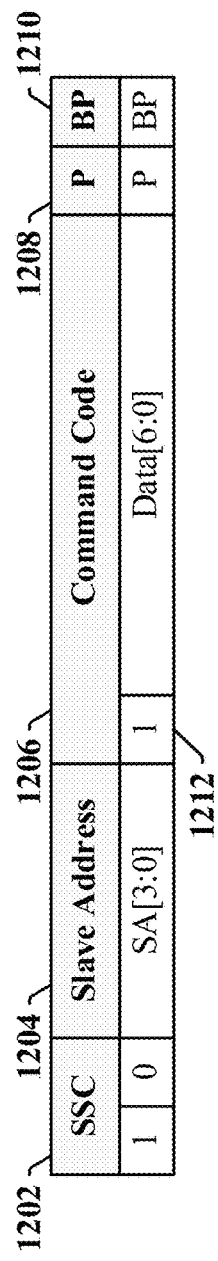
FIG. 12 illustrates datagram structures that may be compliant or compatible with RFFE protocols.
Figure 12:
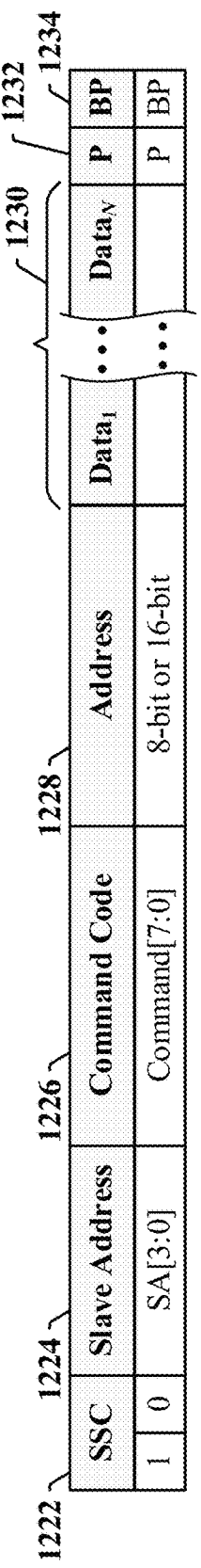

Certain aspects disclosed herein provide optimized protocols that may be used in a hardware-limited datalink. In one example, a protocol based on RFFE protocols can be used to manage and/or control communication on a single-wire PWM datalink. In some implementations, optimized protocols define or redefine datagram structures that support communication between RF front-end devices. FIG. 12 illustrates datagrams 1200, 1220 that may be compliant or compatible with conventional RFFE protocols. The datagrams 1200, 1220 represent Write commands that may be transmitted in datagrams defined by RFFE protocols.

The first datagram 1200 corresponds to a Register 0 Write command that has limited data payload capacity. The first datagram 1200 commences with transmission of a two-bit sequence start condition (SSC 1202) followed by a slave address 1204 or other device identifier. In the first datagram 1200, the slave address 1204 has four bits. The 8-bit command field 1206 is transmitted next, with the first bit 1212 set to logic 1 indicating that the command is a Register 0 Write command. The command field 1206 also carries a seven bit data payload. In the first datagram 1200, the command field 1206 may include a parity bit 1208 and may be followed by bus park signaling 1210.

The datagram 1220 represents a generalized Write command that may be transmitted in datagrams defined by RFFE protocols. The datagram 1220 commences with transmission of a two-bit SSC 1222 followed by a four-bit slave address 1224 or another device identifier. The 8-bit command code 1226 is transmitted next. The command code 1226 may be followed by a parity bit (not shown) followed by an address field 1228, which may have an 8-bit length or a 16-bit length (for extended register writes commands). One or more data frames 1230 may be transmitted before a parity bit 1232 and bus park signaling 1234. Data frames 1230 may include 8-bit bytes with parity.

The conventional RFFE bus architecture employs a two-wire bus of two interface lines, including a clock wire (SCLK) and a data wire (SDATA). In certain applications, it may be desirable for RFFE devices to communicate in both directions through a single-wire interface. In some instances, RFFE devices closer to the antenna, such as an antenna tuner, may be required to use a 1-wire RFFE datalink. An RFFE datalink close to an antenna may be operated at low speed to avoid RFFE switching noise interfering with the received signal. The reduced speed of operation of the RFFE datalink using the current RFFE protocol results in increased transmission latency.

Certain aspects disclosed herein provide a protocol structure that can support reduced speed operation over a single-wire datalink with minimal overhead and reduced transmission latency. The protocols may be used for bidirectional exchange of PWM-encoded data using datagrams that are initiated by an edge-triggered SSC. In some implementations, the SSC may include a sampling timing reference for PWM decoding at the receiver. In some aspects, RFFE devices may be operable in multiple modes, including conventional and modified RFFE modes, where protocol switches may be accomplished dynamically and/or without register configuration.

Figure 13:
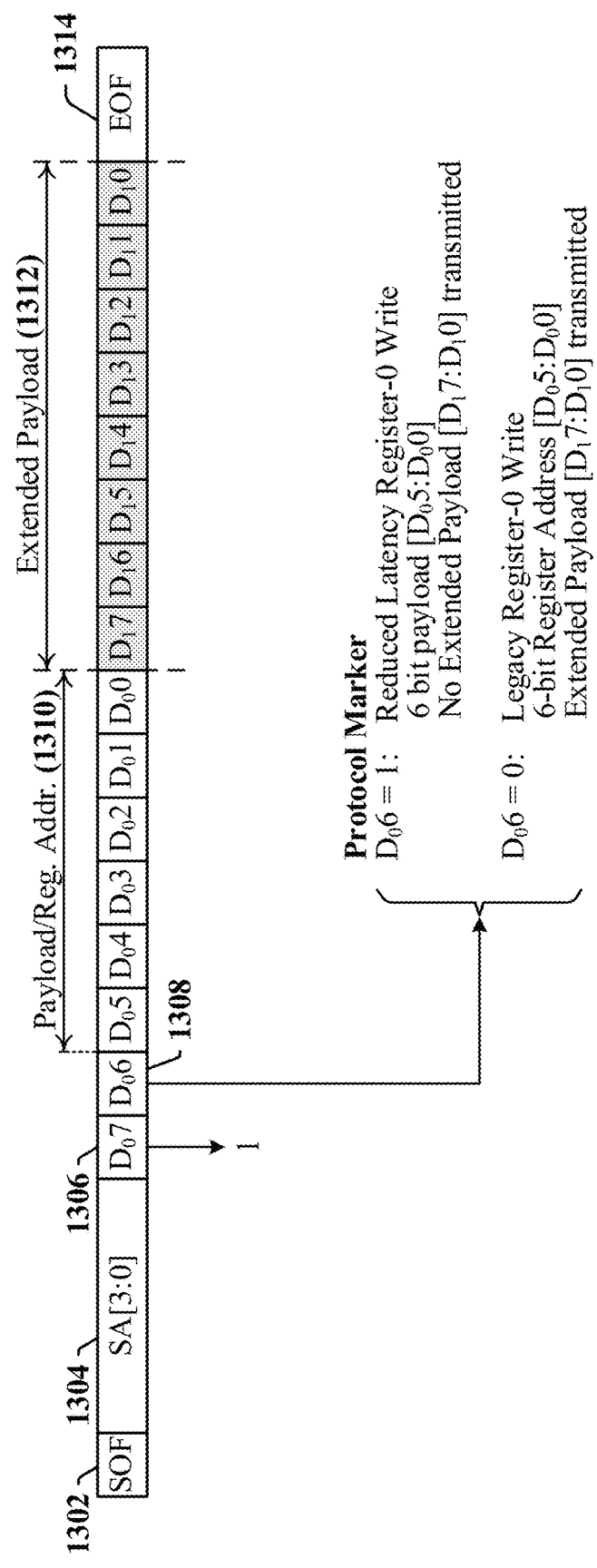
FIG. 13 is a generalized illustration datagram that may be used for PWM communication between RFFE devices in accordance with certain aspects disclosed herein.

FIG. 13 illustrates a datagram 1300 that may be used for PWM communication between RFFE devices in accordance with certain aspects disclosed herein. The datagram 1300 may correspond to, or may be based upon a Register-0 Write command. The datagram 1300 commences with transmission of a one-bit SSC, which may also be referred to as a start of frame (SOF 1302). The SOF 1302 may include a sampling timing reference where, for example, a 50% duty cycle pulse is provided to identify an ideal or optimal sampling point for each bit in a PWM-encoded datagram. The SOF 1302 may be followed by a slave address 1304, which may identify one or more slave devices. In the illustrated example, the slave address 1304 has four bits. An 8-bit field is transmitted next, with the first bit 1306 set to binary one, indicating that the command is a Register 0 Write command in accordance with RFFE protocols.

A second bit 1308 of the datagram 1300 identifies the content of the remaining 6-bit payload 1310. The second bit 1308 may have a value that identifies the datagram 1300 as a "Reduced Latency Register-0 Write" datagram or a "Legacy Register-0 Write" datagram.

In the illustrated example, the second bit 1308 is set to binary zero to indicate that the datagram 1300 is a Legacy Register-0 Write datagram in which the 6-bit payload 1310 carries data to be written to register-0. The second bit 1308 is set to binary one to indicate that the datagram 1300 is a Reduced Latency Register-0 Write datagram in which the 6-bit payload 1310 carries a register address. In a Reduced Latency Register-0 Write datagram, an extended payload 1312 included in the datagram 1300 may be written to one or more registers identified by the register address in the 6-bit payload 1310. The extended payload 1312 is not transmitted when the second bit 1308 is set to binary zero.

In other examples, the second bit 1308 is set to binary one to indicate that the datagram 1300 is a Legacy Register-0 Write datagram, and set to binary zero to indicate that the datagram 1300 is a Reduced Latency Reg-0 Write datagram.

In some instances, the datagram 1300 is terminated by an End-of-Frame transmission 1314. In one example, the End-of-Frame transmission 1314 includes a period of time during which the bus is maintained in the idle state. The bus may be maintained in the idle state for one or more bit periods. In some instances, the datagram 1300 is terminated without an End-of-Frame transmission 1314 after a configured number of bits has been received in the datagram.

Figure 14:
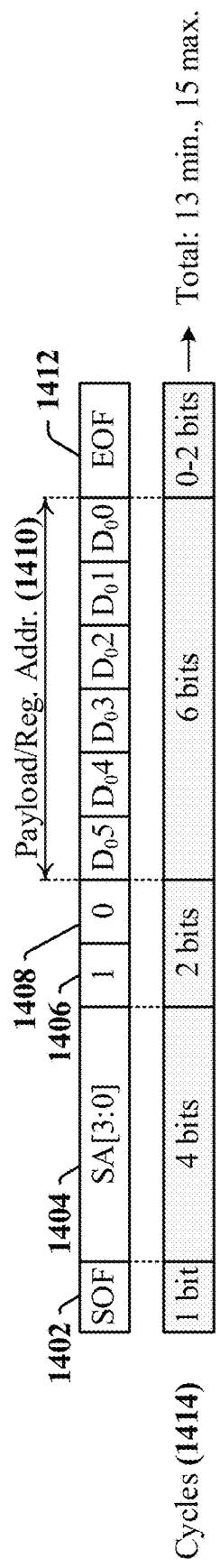
FIG. 14 illustrates a first version of the datagram that may be used for PWM communication between RFFE devices in accordance with certain aspects disclosed herein.

FIG. 14 illustrates a datagram 1400 that is a version of the datagram 1300 illustrated in FIG. 13, and does not include the extended payload 1312. The datagram 1400 commences with transmission of a one-bit SSC, which may also be referred to as a start of frame (SOF 1402). The SOF 1402 may include a sampling timing reference where, for example, a 50% duty cycle pulse is provided to identify an ideal or optimal sampling point for each bit in a PWM-encoded datagram. The SOF 1402 may be followed by a slave address 1404, which identifies one or more slave devices to participate in a transaction. In the illustrated example, the slave address 1404 has four bits. An 8-bit field is transmitted next, with the first bit 1406 set to binary zero, indicating that the command is a Register 0 Write command in accordance with RFFE protocols. A second bit 1408 is set to binary zero to indicate that the 6-bit payload 1410 carries data to be written to register-0. In some instances, the datagram 1400 is terminated by an End-of-Frame transmission 1412. In one example, the End-of-Frame transmission 1412 includes a period of time during which the bus is maintained in the idle state. The bus may be maintained in the idle state for one or more bit periods. In some instances, the datagram 1400 is terminated without an End-of-Frame transmission 1412 after a configured number of bits has been received in the datagram.

The number of clock cycles 1414 used to transmit the datagram 1400 ranges between 13 and 15. The variation in number of clock cycles 1414 may be determined based on whether an End-of-Frame transmission 1412 occurs, and if such transmission occurs, the configuration of the End-of-Frame transmission 1412.

Figure 15:
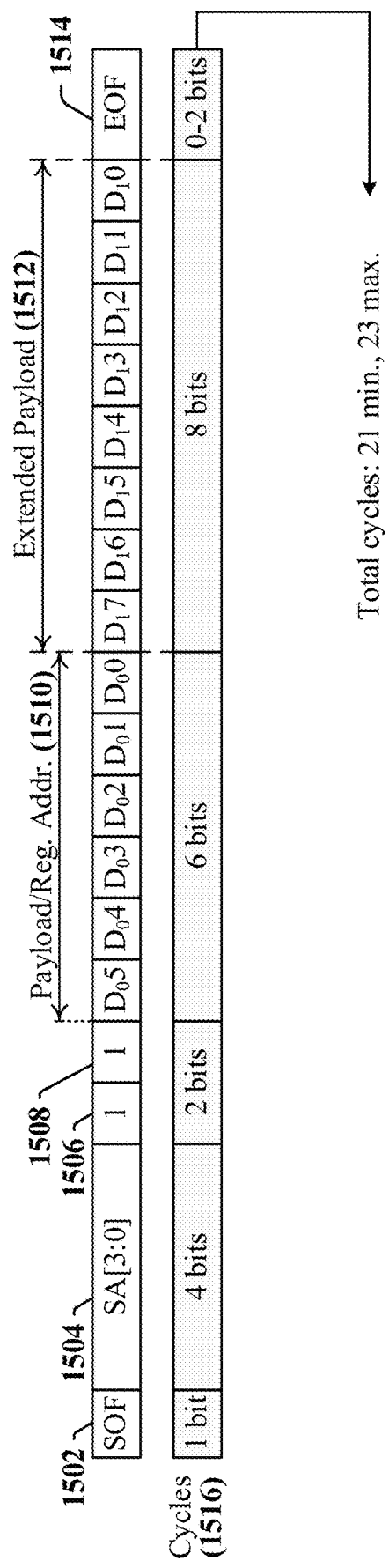
FIG. 15 illustrates a second version of the datagram that may be used for PWM communication between RFFE devices in accordance with certain aspects disclosed herein.

FIG. 15 illustrates a datagram 1500 that is a version of the datagram 1300 illustrated in FIG. 13, and includes an extended payload 1512. The datagram 1500 commences with transmission of a one-bit SSC, which may also be referred to as a start of frame (SOF 1502). The SOF 1502 may include a sampling timing reference where, for example, a 50% duty cycle pulse is provided to identify an ideal or optimal sampling point for each bit in a PWM-encoded datagram. The SOF 1502 may be followed by a slave address 1504, which may identify one or more slave devices to participate in a transaction. In the illustrated example, the slave address 1504 has four bits. An 8-bit field is transmitted next, with the first bit 1506 set to binary zero, indicating that the command is a Register 0 Write command in accordance with RFFE protocols. A second bit 1508 is set to binary one to indicate that the 6-bit payload 1510 carries a register address, at which the extended payload 1512 is to be written. In the illustrated example, the extended payload 1512 includes a single byte, although any number of bits may be transmitted in the extended payload 1512. The number of bits in the extended payload 1512 may be identified in configuration information. In some instances, the datagram 1500 is terminated by an End-of-Frame transmission 1514. In one example, the End-of-Frame transmission 1514 includes a period of time during which the bus is maintained in the idle state. The bus may be maintained in the idle state for one or more bit periods. In some instances, the datagram 1500 is terminated without an End-of-Frame transmission 1514 after a configured number of bits has been received in the datagram.

The number of clock cycles 1516 used to transmit the datagram 1500 ranges between 21 and 23. The variation in number of clock cycles 1516 may be determined based on whether an End-of-Frame transmission 1514 occurs, and if such transmission occurs, the configuration of the End-of-Frame transmission 1514.

Figure 16:
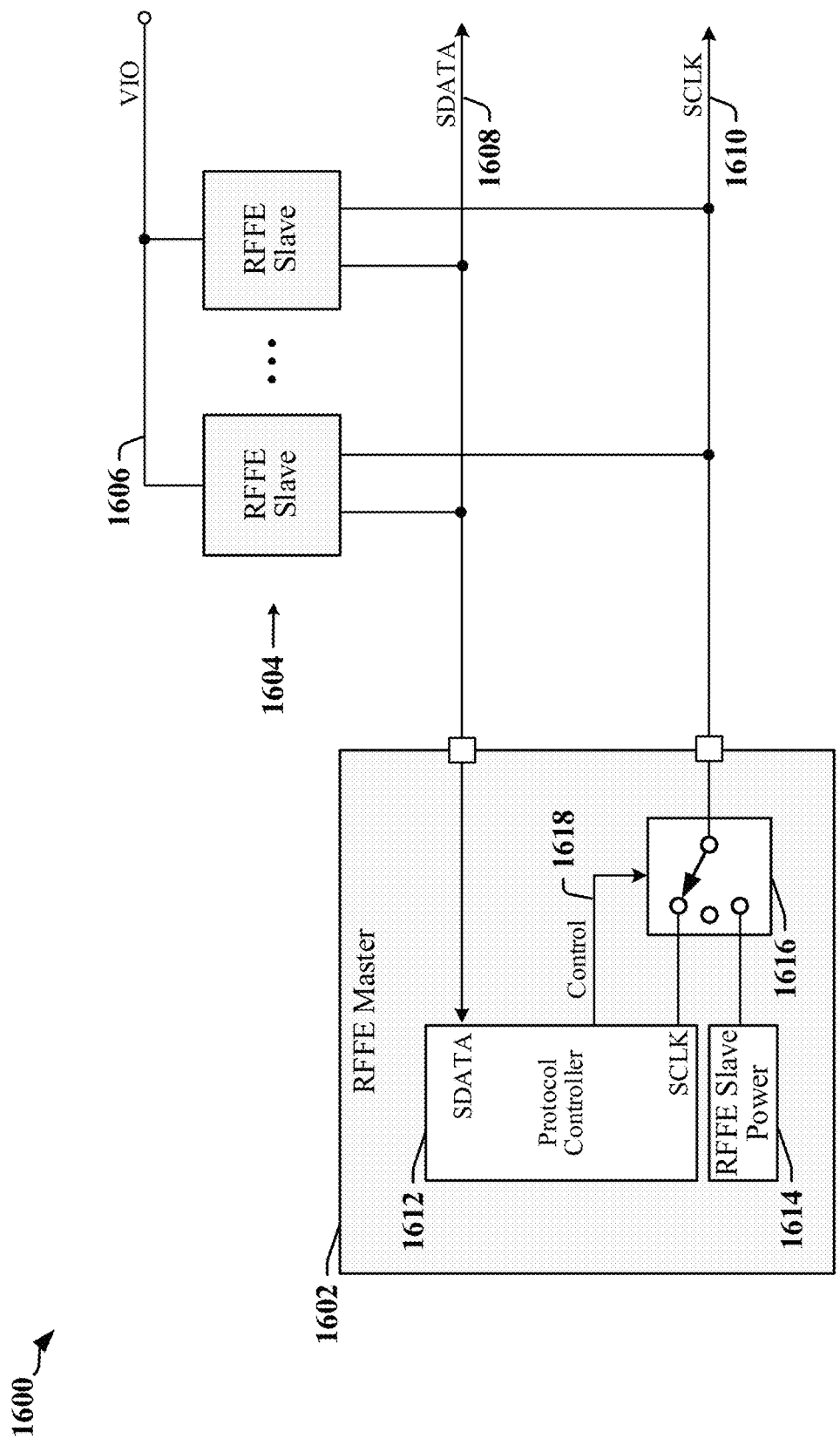
FIG. 16 illustrates a first configuration of a system in which a bus master can be operated in various configurations according to certain aspects disclosed herein.

In accordance with certain aspects disclosed herein, a bus master device may be configured for conventional bus operations and for single-wire bus operations. FIG. 16 illustrates a first example in which a system 1600 has a bus master 1602 that can be operated in various configurations. The bus master 1602 may be provided in an RFIC, modem, application processor or another type of device. In the illustrated system 1600, the bus master 1602 is coupled to one or more slave devices 1604 over a two-wire serial bus that includes an SDATA line 1608 and an SCLK line 1610. The serial bus may be operable according to conventional RFFE protocols in some examples. In certain examples, the serial bus may be operable in accordance with a protocol such as an I3C protocol, an SPMI protocol, or another protocol. Each of the slave devices 1604 is coupled to the SDATA line 1608, SCLK line 1610 and a power supply line 1606.

The bus master 1602 may have a protocol controller 1612, which may be implemented using a processor, controller, state machine or other logic configured to support one or more protocols, and/or to manage operation of the serial bus. In some implementations, the protocol controller 1612 may determine a configuration of the serial bus and may determine the purpose of the wires of the serial bus. In one example, the protocol controller 1612 provides a control signal 1618 that selects a mode of operation for one or more wires of the serial bus. In the illustrated system 1600, the control signal 1618 is used to select between two or more inputs of a switch 1616 to serve as the output of the switch 1616. In this example, the switch 1616 is configured to couple a clock signal to the SCLK line 1610 of the serial bus. The bus master 1602 may also include a power supply 1614 that can be used to power one or more slave devices.

Figure 17:
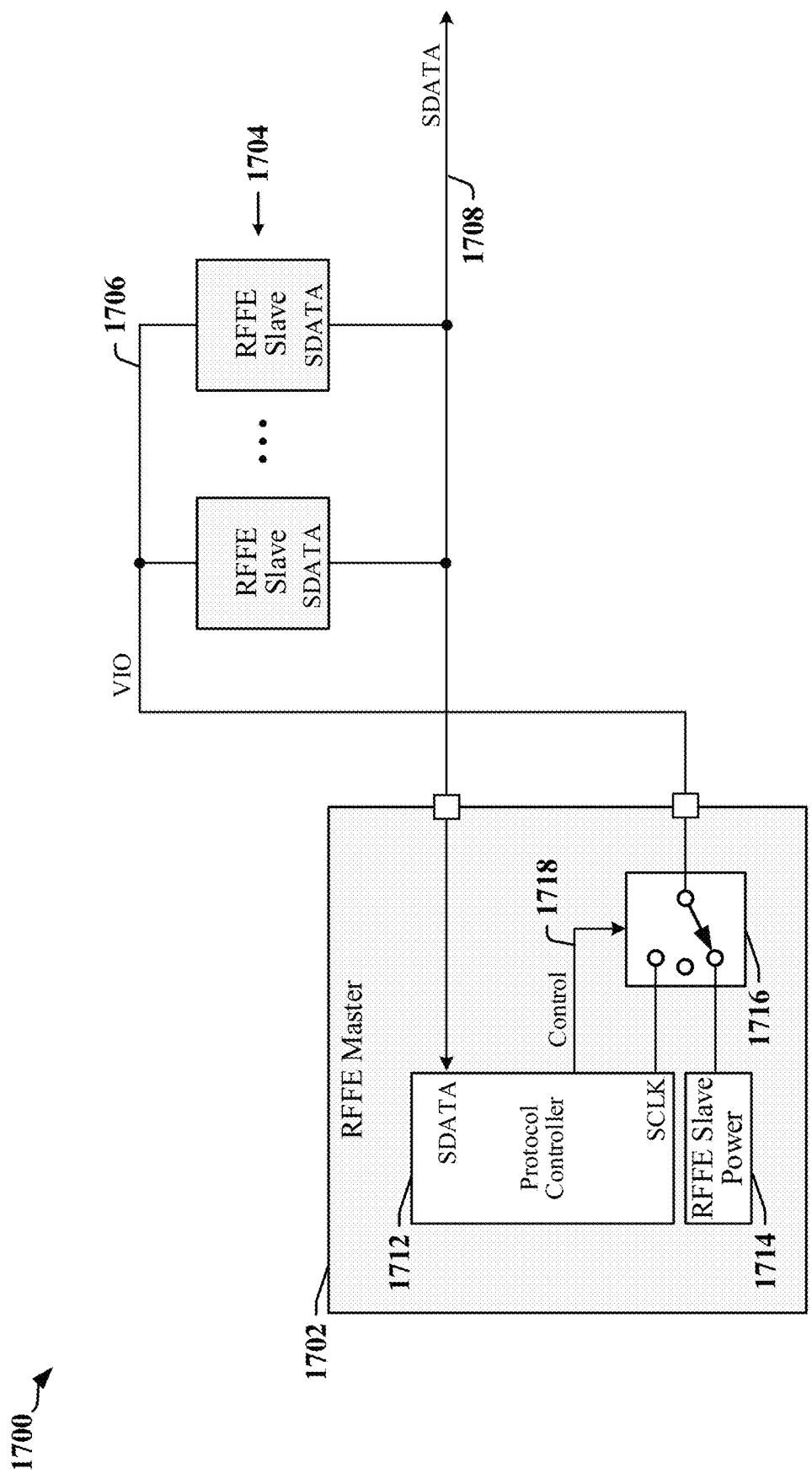
FIG. 17 illustrates a second configuration of a system in which a bus master can be operated in various configurations according to certain aspects disclosed herein.

FIG. 17 illustrates a second example in which a system 1700 has a bus master 1702 that can be operated in various configurations. The bus master 1702 may be provided in an RFIC, modem, application processor or another type of device. In the illustrated system 1700, the bus master 1702 is coupled to one or more slave devices 1704 over a one-wire serial bus that provides an SDATA line 1708 with no SCLK line. In the illustrated example, the serial bus may be operated according to a modified RFFE protocol in which PWM encoded datagrams are exchanged over the SDATA line 1708. Each of the slave devices 1704 is coupled to the SDATA line 1708 and a power supply line 1706 provided by the bus master 1702.

The bus master 1702 may have a protocol controller 1712, which may be implemented using a processor, controller, state machine or other logic configured to support one or more protocols, and/or to manage operation of the serial bus. In some implementations, the protocol controller 1712 may determine a configuration of the serial bus and may determine the purpose of the wires of the serial bus. In one example, the protocol controller 1712 provides a control signal 1718 that selects a mode of operation of one or more wires of the serial bus. In the illustrated system 1700, the control signal 1718 is used to select between two or more inputs of a switch 1716 to serve as the output of the switch 1716. In this example, the bus master 1702 includes a power source 1714 that can be used to power one or more slave devices, and the switch 1716 couples an output of the power source 1714 to the power supply line of at least one of the slave devices 1704.

Figure 18:
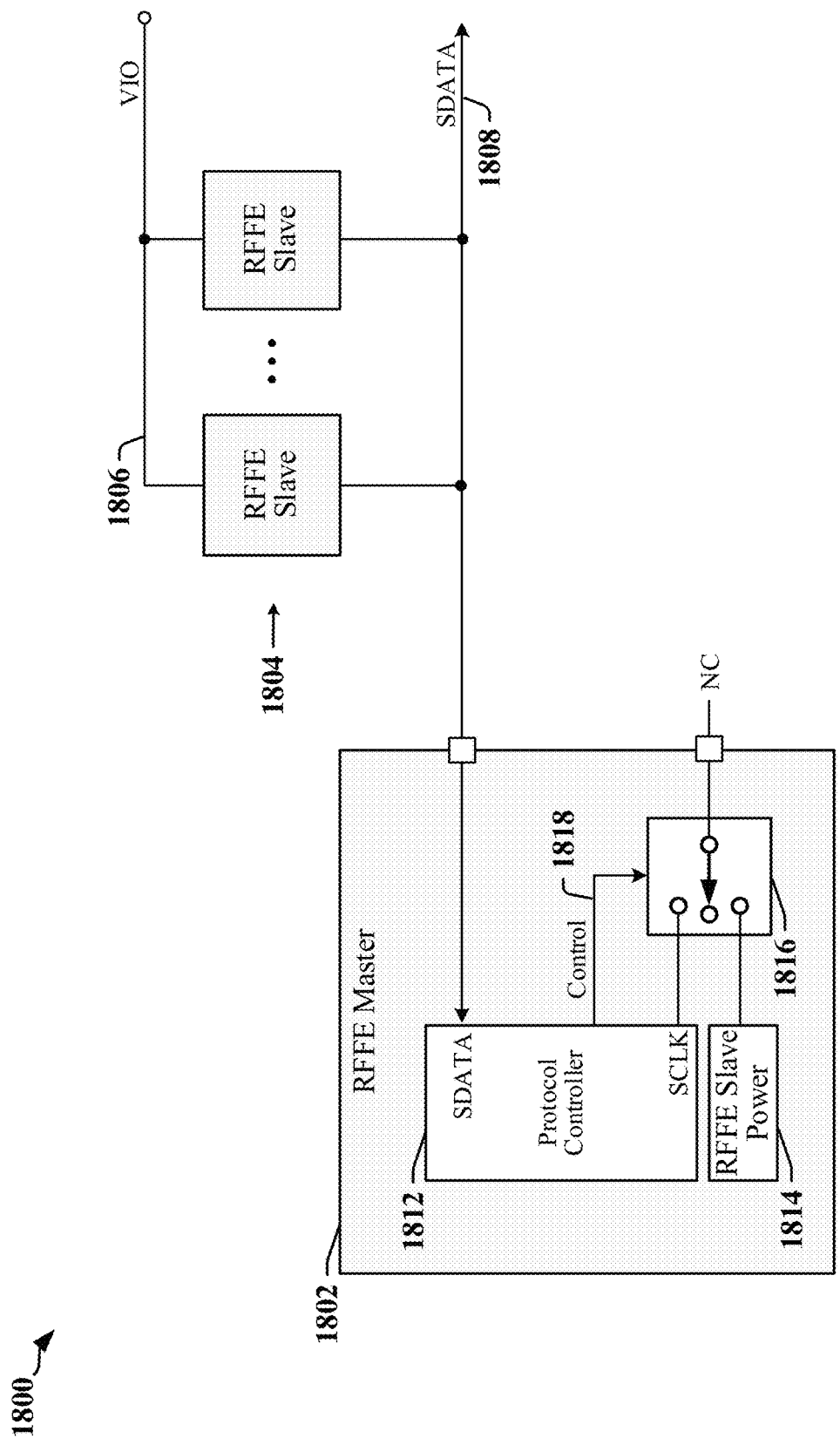
FIG. 18 illustrates a third configuration of a system in which a bus master can be operated in various configurations according to certain aspects disclosed herein.

FIG. 18 illustrates a third example in which a system 1800 has a bus master 1802 that can be operated in various configurations. The bus master 1802 may be provided in an RFIC, modem, application processor or another type of device. In the illustrated system 1800, the bus master 1802 is coupled to one or more slave devices 1804 over a one-wire serial bus that provides an SDATA line 1808 with no SCLK line. In the illustrated system 1800, the serial bus may be operated according to a modified RFFE protocol in which PWM encoded datagrams are exchanged over the SDATA line 1808. Each of the slave devices 1804 is coupled to the SDATA line 1808 and a power supply line 1806.

The bus master 1802 may have a protocol controller 1812, which may be implemented using a processor, controller, state machine or other logic configured to support one or more protocols, and/or to manage operation of the serial bus. In some implementations, the protocol controller 1812 may determine a configuration of the serial bus and may determine the purpose of the wires of the serial bus. In one example, the protocol controller 1812 provides a control signal 1818 that selects a mode of operation of one or more wires of the serial bus. In the illustrated system 1800, the control signal 1818 is used to select between two or more inputs of a switch 1816 to serve as the output of the switch 1816. In this example, the switch 1816 effectively disconnects the switch 1816 from the serial bus. The bus master 1802 may also include a power source 1814 that can be used to drive one or more slave devices.

Examples of Processing Circuits and Methods

Figure 19:
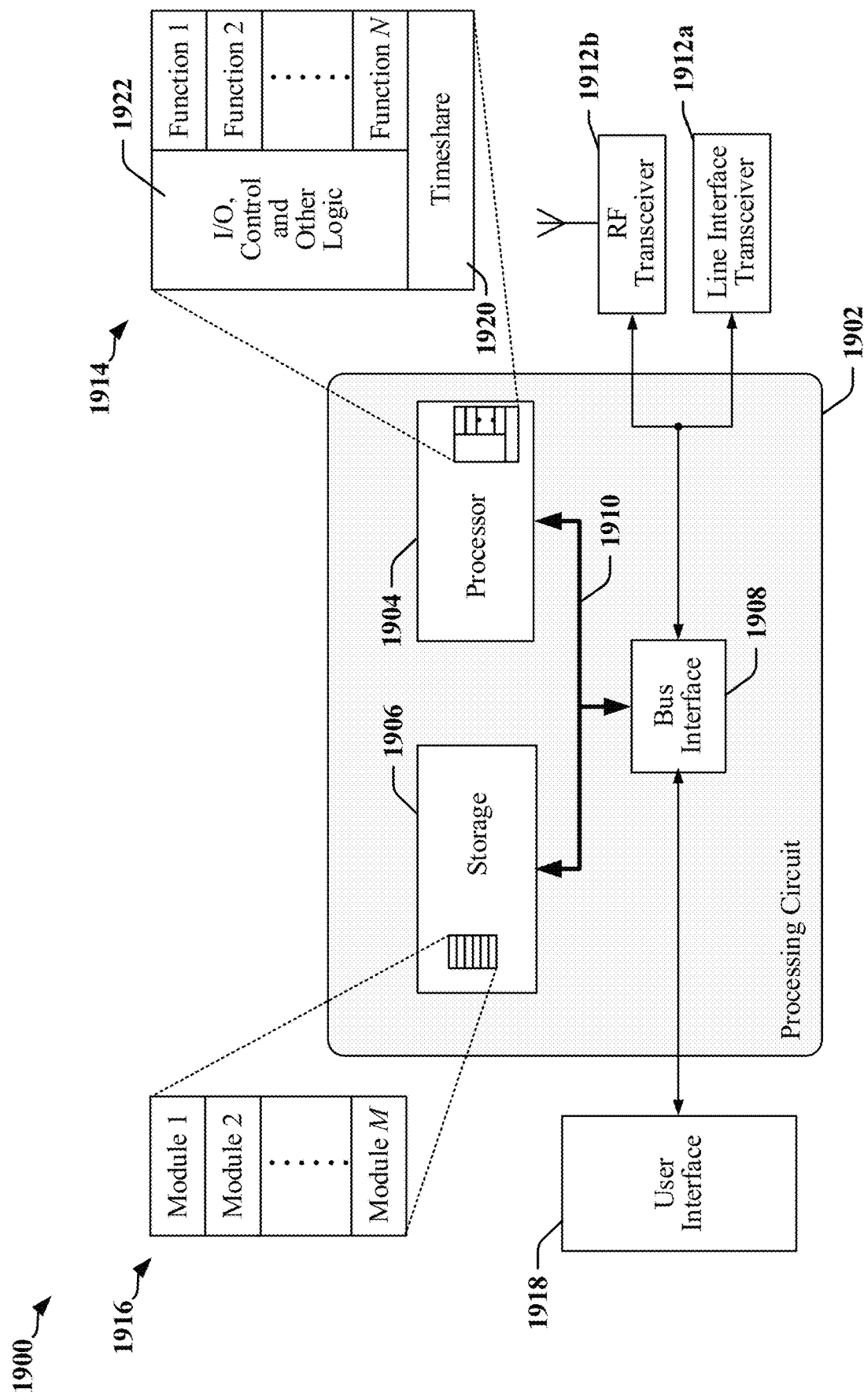
FIG. 19 illustrates one example of an apparatus employing a processing circuit that may be adapted according to certain aspects disclosed herein.

FIG. 19 is a diagram illustrating an example of a hardware implementation for an apparatus 1900. In some examples, the apparatus 1900 may perform one or more functions disclosed herein. In accordance with various aspects of the disclosure, an element, or any portion of an element, or any combination of elements as disclosed herein may be implemented using a processing circuit 1902. The processing circuit 1902 may include one or more processors 1904 that are controlled by some combination of hardware and software modules. Examples of processors 1904 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1904 may include specialized processors that perform specific functions, and that may be configured, augmented or controlled by one of the software modules 1916. The one or more processors 1904 may be configured through a combination of software modules 1916 loaded during initialization, and further configured by loading or unloading one or more software modules 1916 during operation.

In the illustrated example, the processing circuit 1902 may be implemented with a bus architecture, represented generally by the bus 1910. The bus 1910 may include any number of interconnecting buses and bridges depending on the specific application of the processing circuit 1902 and the overall design constraints. The bus 1910 links together various circuits including the one or more processors 1904, and storage 1906. Storage 1906 may include memory devices and mass storage devices, and may be referred to herein as computer-readable media and/or processor-readable media. The bus 1910 may also link various other circuits such as timing sources, timers, peripherals, voltage regulators, and power management circuits. A bus interface 1908 may provide an interface between the bus 1910 and one or more transceivers 1912a, 1912b. A transceiver 1912a, 1912b may be provided for each networking technology supported by the processing circuit. In some instances, multiple networking technologies may share some or all of the circuitry or processing modules found in one or more transceivers 1912a, 1912b. Each transceiver 1912a, 1912b provides a means for communicating with various other apparatus over a transmission medium. In one example, a transceiver 1912a may be used to couple the apparatus 1900 to a multi-wire bus. In another example, a transceiver 1912b may be used to connect the apparatus 1900 to a radio access network. Depending upon the nature of the apparatus 1900, a user interface 1918 (e.g., keypad, display, speaker, microphone, joystick) may also be provided, and may be communicatively coupled to the bus 1910 directly or through the bus interface 1908.

A processor 1904 may be responsible for managing the bus 1910 and for general processing that may include the execution of software stored in a computer-readable medium that may include the storage 1906. In this respect, the processing circuit 1902, including the processor 1904, may be used to implement any of the methods, functions and techniques disclosed herein. The storage 1906 may be used for storing data that is manipulated by the processor 1904 when executing software, and the software may be configured to implement any one of the methods disclosed herein.

One or more processors 1904 in the processing circuit 1902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1906 or in an external computer-readable medium. The external computer-readable medium and/or storage 1906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1906 may also include, by way of example, a carrier wave, a transmission line, and any other suitable medium for transmitting software and/or instructions that may be accessed and read by a computer. Computer-readable medium and/or the storage 1906 may reside in the processing circuit 1902, in the processor 1904, external to the processing circuit 1902, or be distributed across multiple entities including the processing circuit 1902. The computer-readable medium and/or storage 1906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1906 may maintain software maintained and/or organized in loadable code segments, modules, applications, programs, etc., which may be referred to herein as software modules 1916. Each of the software modules 1916 may include instructions and data that, when installed or loaded on the processing circuit 1902 and executed by the one or more processors 1904, contribute to a run-time image 1914 that controls the operation of the one or more processors 1904. When executed, certain instructions may cause the processing circuit 1902 to perform functions in accordance with certain methods, algorithms and processes described herein.

Some of the software modules 1916 may be loaded during initialization of the processing circuit 1902, and these software modules 1916 may configure the processing circuit 1902 to enable performance of the various functions disclosed herein. For example, some software modules 1916 may configure internal devices and/or logic circuits 1922 of the processor 1904, and may manage access to external devices such as a transceiver 1912a, 1912b, the bus interface 1908, the user interface 1918, timers, mathematical coprocessors, and so on. The software modules 1916 may include a control program and/or an operating system that interacts with interrupt handlers and device drivers, and that controls access to various resources provided by the processing circuit 1902. The resources may include memory, processing time, access to a transceiver 1912a, 1912b, the user interface 1918, and so on.

One or more processors 1904 of the processing circuit 1902 may be multifunctional, whereby some of the software modules 1916 are loaded and configured to perform different functions or different instances of the same function. The one or more processors 1904 may additionally be adapted to manage background tasks initiated in response to inputs from the user interface 1918, the transceiver 1912a, 1912b, and device drivers, for example. To support the performance of multiple functions, the one or more processors 1904 may be configured to provide a multitasking environment, whereby each of a plurality of functions is implemented as a set of tasks serviced by the one or more processors 1904 as needed or desired. In one example, the multitasking environment may be implemented using a timesharing program 1920 that passes control of a processor 1904 between different tasks, whereby each task returns control of the one or more processors 1904 to the timesharing program 1920 upon completion of any outstanding operations and/or in response to an input such as an interrupt. When a task has control of the one or more processors 1904, the processing circuit is effectively specialized for the purposes addressed by the function associated with the controlling task. The timesharing program 1920 may include an operating system, a main loop that transfers control on a round-robin basis, a function that allocates control of the one or more processors 1904 in accordance with a prioritization of the functions, and/or an interrupt driven main loop that responds to external events by providing control of the one or more processors 1904 to a handling function.

Methods for optimizing virtual GPIO latency may include an act of parsing various input sources including sources of GPIO signal state, parameters and/or messages to be transmitted. The input sources may include hardware events, configuration data, mask parameters, and register addresses. Packet-specific latency estimators may be employed to estimate the latency for corresponding packet types based upon the parsed parameters. A packet type to be used for transmission may be selected based on the minimum latency calculated or determined for available packet types. The selected packet type may be identified using a command code, which may be provided to a packetizer with a payload to be transmitted. The command code may also reflect a protocol to be used to transmit the payload. In some implementations, the physical link used to transmit the payload may be operated according to different protocols or different variants of one or more protocols.

The protocol to be used for transmitting the payload may be selected based on latencies associated with the various availab2le protocols or variants of protocols.

Figure 20:
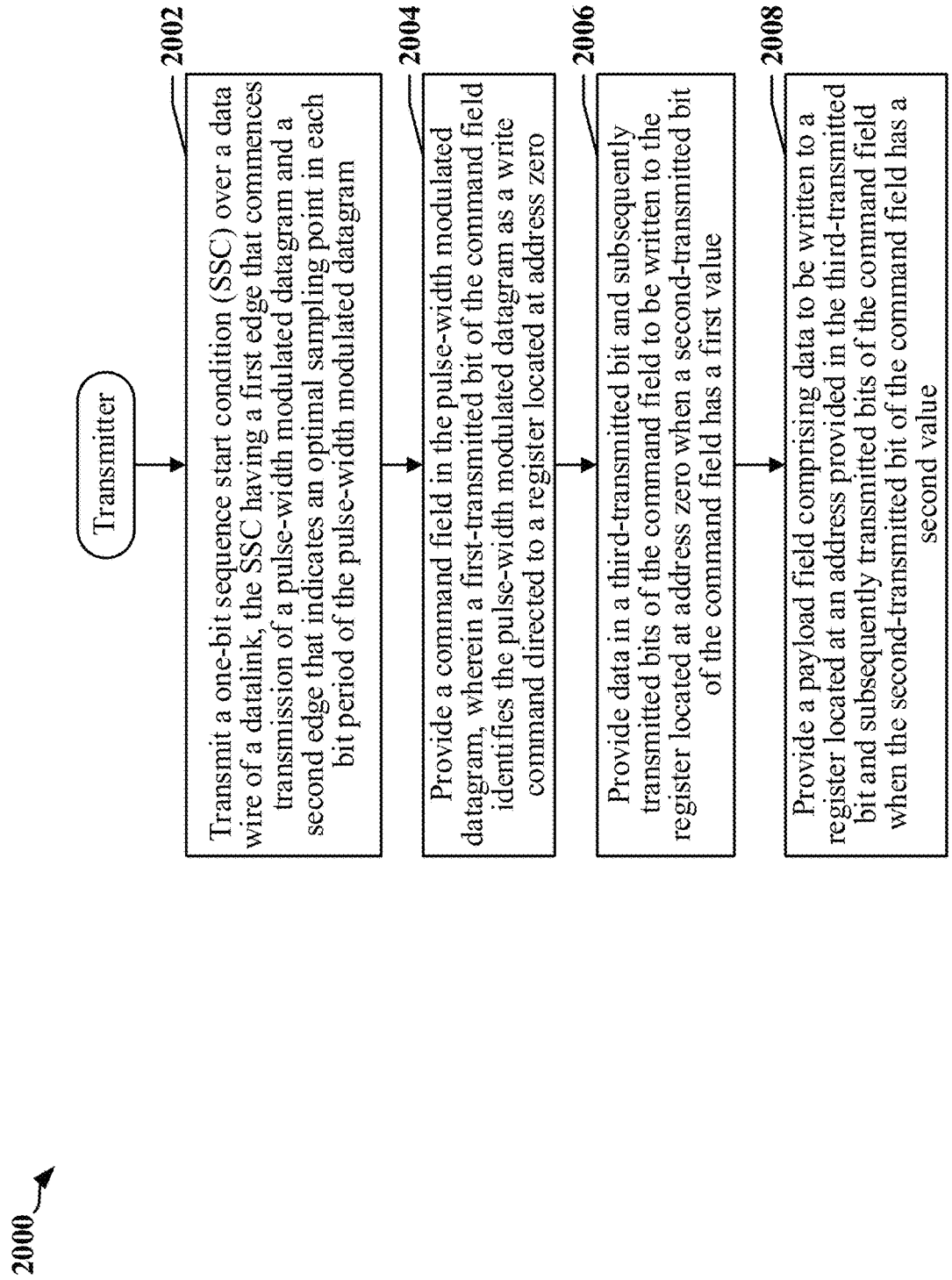
FIG. 20 is a flowchart that illustrates certain aspects disclosed herein.

FIG. 20 is a flowchart 2000 of a method that may be performed by a master device coupled to a serial datalink. In one example, the serial datalink may be used to carry PWM-encoded frames of data.

At block 2002, the master device may transmit a one-bit SSC over a data wire of a datalink. The SSC may have a first edge that commences transmission of a pulse-width modulated datagram and a second edge that indicates an optimal sampling point in each bit period of the pulse-width modulated datagram. The SSC may have a width that is different from a width of each pulse that encodes data in the pulse-width modulated datagram.

At block 2004, the master device may provide a command field in the pulse-width modulated datagram where a first-transmitted bit of the command field identifies the datagram as a write command directed to a register located at address zero. At block 2006, the master device may provide data in a third-transmitted bit and subsequently-transmitted bits of the command field to be written to the register located at address zero when a second-transmitted bit of the command field has a first value.

At block 2008, the master device may provide a payload field comprising data to be written to a register located at an address provided in the third-transmitted bit and the subsequently-transmitted bits of the command field when the second-transmitted bit of the command field has a second value. The payload field may be transmitted after the command field when the second-transmitted bit of the command field has the second value. The payload field may include one or more bytes of data.

In some examples, a slave address is provided in the pulse-width modulated datagram. The slave device may select one or more of a plurality of slave devices coupled to the data wire to receive the datagram. The master device may provide a power supply to the plurality of slave devices.

In certain examples, the master device may reconfigure the datalink for communication according to an RFFE protocol, and transmit an RFFE datagram on the data wire of the datalink in accordance with timing provided by a clock signal transmitted on a clock line of the datalink. Reconfiguring the datalink may include enabling transmission of the clock signal, wherein transmission of the clock signal is suppressed during transmission of the pulse-width modulated datagram.

Figure 21:
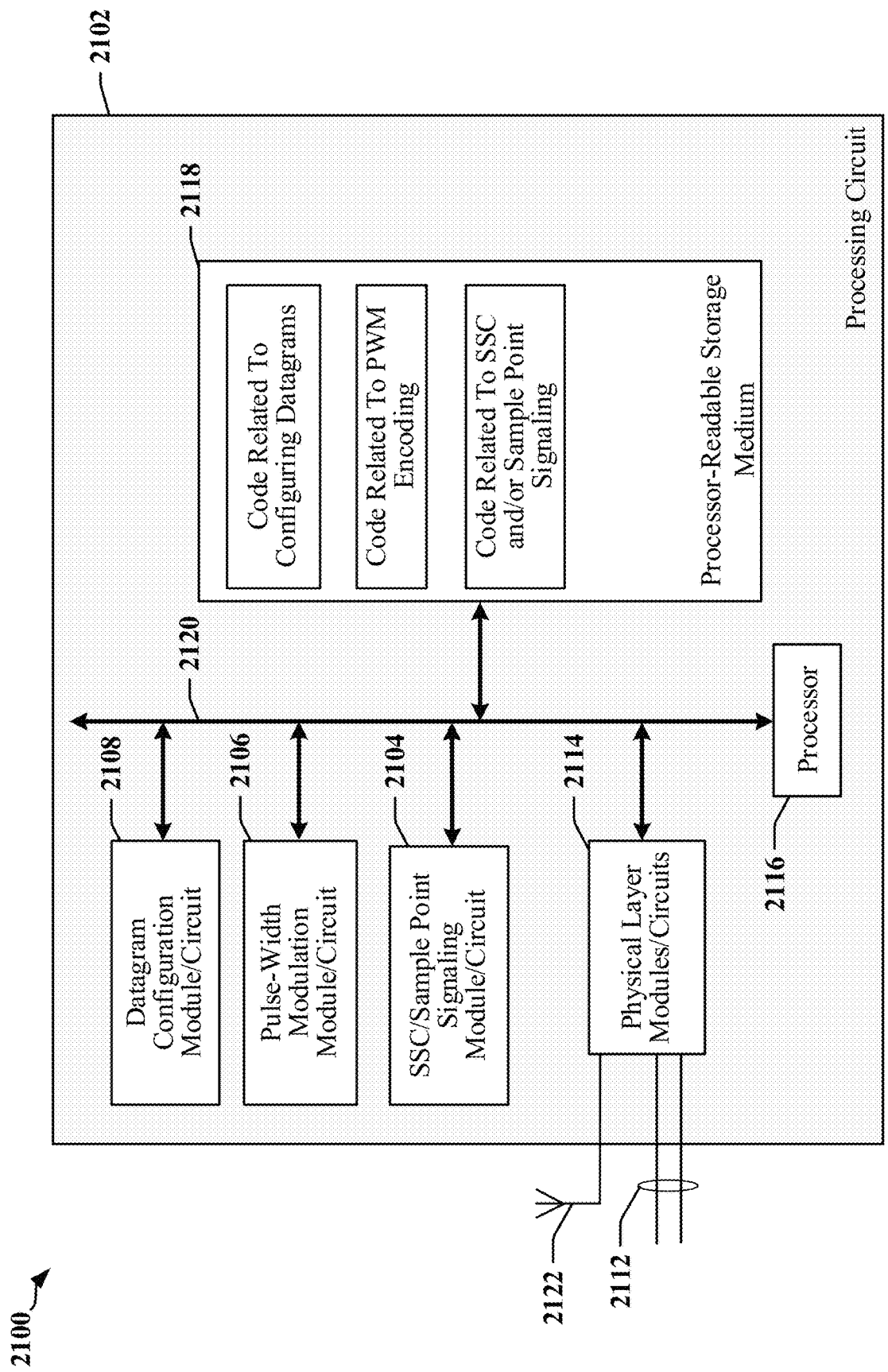
FIG. 21 illustrates an example of a hardware implementation for a first apparatus adapted in accordance with certain aspects disclosed herein.

FIG. 21 is a diagram illustrating a simplified example of a hardware implementation for an apparatus 2100 employing a processing circuit 2102. The processing circuit typically has a controller or processor 2116 that may include one or more microprocessors, microcontrollers, digital signal processors, sequencers and/or state machines. The processing circuit 2102 may be implemented with a bus architecture, represented generally by the bus 2120. The bus 2120 may include any number of interconnecting buses and bridges depending on the specific application of the processing circuit 2102 and the overall design constraints. The bus 2120 links together various circuits including one or more processors and/or hardware modules, represented by the controller or processor 2116, the modules or circuits 2104, 2106 and 2108 and the processor-readable storage medium 2118. One or more physical layer circuits and/or modules 2114 may be provided to support communications over a communication link implemented using a multi-wire bus 2112, through an antenna or antenna array 2122 (to a radio access network for example), and so on. The bus 2120 may also link various other circuits such as timing sources, peripherals, voltage regulators, and power management circuits, which are well known in the art, and therefore, will not be described any further.

The processor 2116 is responsible for general processing, including the execution of software, code and/or instructions stored on the processor-readable storage medium 2118. The processor-readable storage medium 2118 may include a non-transitory storage medium. The software, when executed by the processor 2116, causes the processing circuit 2102 to perform the various functions described supra for any particular apparatus. The processor-readable storage medium 2118 may be used for storing data that is manipulated by the processor 2116 when executing software. The processing circuit 2102 further includes at least one of the modules 2104, 2106 and 2108. The modules 2104, 2106 and 2108 may be software modules running in the processor 2116, resident/stored in the processor-readable storage medium 2118, one or more hardware modules coupled to the processor 2116, or some combination thereof. The modules 2104, 2106 and 2108 may include microcontroller instructions, state machine configuration parameters, or some combination thereof.

In one configuration, the apparatus 2100 includes modules and/or circuits 2104 adapted to provide signaling that serves as an SSC and identifies an optimal and/or ideal sampling point for each bit in a PWM-encoded datagram. The apparatus 2100 may include modules and/or circuits 2106 adapted to encode data in PWM datagrams, and modules and/or circuits 2104 adapted to configure and construct low-latency datagrams.

In one example, the apparatus 2100 includes physical layer circuits and/or modules 2114 that implement an interface circuit adapted to couple the apparatus 2100 to a serial bus. The apparatus 2100 may have a protocol controller configured to provide a one-bit SSC over a data wire of a datalink, the SSC having a first edge that commences a pulse-width modulated datagram and a second edge that indicates an optimal sampling point in each bit period of the pulse-width modulated datagram. The protocol controller may be configured to provide a command field in the pulse-width modulated datagram where the first-transmitted bit of the command field identifies the datagram as a write command directed to a register located at address zero. The protocol controller may be configured to provide data in a third-transmitted bit and subsequently-transmitted bits of the command field to be written to the register located at address zero when a second-transmitted bit of the command field has a first value. The protocol controller may be configured to provide a payload field comprising data to be written to a register located at an address provided in the third-transmitted bit and the subsequently-transmitted bits of the command field when the second-transmitted bit of the command field has a second value.

The SSC may have a width that is different from a width of each pulse that encodes data in the pulse-width modulated datagram. The payload field may be transmitted after the command field when the second-transmitted bit of the command field has the second value. The payload field may include one or more bytes of data.

The protocol controller may be configured to transmit a slave address in the pulse-width modulated datagram, the slave address selecting one or more of a plurality of slave devices coupled to the data wire to receive the datagram. The protocol controller may be configured to provide a power supply to the plurality of slave devices.

The protocol controller may be configured to reconfigure the datalink for communication according to a RFFE protocol, and transmit an RFFE datagram on the data wire of the datalink in accordance with timing provided by a clock signal transmitted on a clock line of the datalink.

The protocol controller may be configured to enable transmission of the clock signal when reconfiguring the datalink for communication according to the RFFE protocol. Transmission of the clock signal may be suppressed during transmission of the pulse-width modulated datagram.

The processor-readable storage medium 2118 may include transitory or non-transitory storage devices configured to store code, instructions and/or parameters used to implement one or more methods or procedures disclosed herein. The processor-readable storage medium 2118 may include code for transmitting a one-bit SSC over a data wire of a datalink, the SSC having a first edge that commences transmission of a pulse-width modulated datagram and a second edge that indicates an optimal sampling point in each bit period of the pulse-width modulated datagram. The processor-readable storage medium 2118 may include code for providing a command field in the pulse-width modulated datagram, wherein a first-transmitted bit of the command field identifies the datagram as a write command directed to a register located at address zero, providing data in a third-transmitted bit and subsequently-transmitted bits of the command field to be written to the register located at address zero when a second-transmitted bit of the command field has a first value, and providing a payload field comprising data to be written to a register located at an address provided in the third-transmitted bit and the subsequently-transmitted bits of the command field when the second-transmitted bit of the command field has a second value.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communications, comprising:
   transmitting a one-bit sequence start condition (SSC) over a data wire of a datalink, the SSC having a first edge that commences transmission of a pulse-width modulated datagram and a second edge that indicates an optimal sampling point in each bit period of the pulse-width modulated datagram;
   providing a command field in the pulse-width modulated datagram, wherein a first-transmitted bit of the command field identifies the pulse-width modulated datagram as a write command directed to a register located at address zero;
   providing data in a third-transmitted bit and subsequently-transmitted bits of the command field to be written to the register located at address zero when a second-transmitted bit of the command field has a first value; and
   providing a payload field comprising data to be written to a register located at an address provided in the third-transmitted bit and the subsequently-transmitted bits of the command field when the second-transmitted bit of the command field has a second value.

2. The method of claim 1, wherein the SSC has a width that is different from a width of each pulse that encodes data in the pulse-width modulated datagram.

3. The method of claim 1, wherein the payload field is transmitted after the command field when the second-transmitted bit of the command field has the second value.

4. The method of claim 1, wherein the payload field comprises one or more bytes of data.

5. The method of claim 1, further comprising:
providing a slave address in the pulse-width modulated datagram, the slave address selecting one or more of a plurality of slave devices coupled to the data wire to receive the pulse-width modulated datagram.

6. The method of claim 5, further comprising:
providing a power supply to the plurality of slave devices.

7. The method of claim 1, further comprising:
reconfiguring the datalink for communication according to a Radio Frequency Front-End (RFFE) protocol; and
transmitting an RFFE datagram on the data wire of the datalink in accordance with timing provided by a clock signal transmitted on a clock line of the datalink.

8. The method of claim 7, wherein reconfiguring the datalink comprises:
enabling transmission of the clock signal, wherein the transmission of the clock signal is suppressed during the transmission of the pulse-width modulated datagram.

9. An apparatus, comprising:
an interface circuit adapted to couple the apparatus to a datalink; and
a protocol controller configured to:
transmit a one-bit sequence start condition (SSC) over a data wire of the datalink, the SSC having a first edge that commences transmission of a pulse-width modulated datagram and a second edge that indicates an optimal sampling point in each bit period of the pulse-width modulated datagram;
provide a command field in the pulse-width modulated datagram, wherein a first-transmitted bit of the command field identifies the pulse-width modulated datagram as a write command directed to a register located at address zero;
provide data in a third-transmitted bit and subsequently-transmitted bits of the command field to be written to the register located at address zero when a second-transmitted bit of the command field has a first value; and
provide a payload field comprising data to be written to a register located at an address provided in the third-transmitted bit and the subsequently-transmitted bits of the command field when the second-transmitted bit of the command field has a second value.

10. The apparatus of claim 9, wherein the SSC has a width that is different from a width of each pulse that encodes data in the pulse-width modulated datagram.

11. The apparatus of claim 9, wherein the payload field is transmitted after the command field when the second-transmitted bit of the command field has the second value.

12. The apparatus of claim 9, wherein the payload field comprises one or more bytes of data.

13. The apparatus of claim 9, wherein the protocol controller is further configured to:
transmit a slave address in the pulse-width modulated datagram, the slave address selecting one or more of a plurality of slave devices coupled to the data wire to receive the pulse-width modulated datagram.

14. The apparatus of claim 13, wherein the protocol controller is further configured to:
provide a power supply to the plurality of slave devices.

15. The apparatus of claim 9, wherein the protocol controller is further configured to:
reconfigure the datalink for communication according to a Radio Frequency Front-End (RFFE) protocol; and
transmit an RFFE datagram on the data wire of the datalink in accordance with timing provided by a clock signal transmitted on a clock line of the datalink.

16. The apparatus of claim 15, wherein the protocol controller is further configured to:
enable transmission of the clock signal when reconfiguring the datalink for communication according to the RFFE protocol, wherein the transmission of the clock signal is suppressed during the transmission of the pulse-width modulated datagram.

17. An apparatus comprising:
means for transmitting a one-bit sequence start condition (SSC) over a data wire of a datalink, the SSC having a first edge that commences transmission of a pulse-width modulated datagram and a second edge that indicates an optimal sampling point in each bit period of the pulse-width modulated datagram; and
means for providing fields in the pulse-width modulated datagram, including a command field that comprises a first-transmitted bit of the command field identifying the pulse-width modulated datagram as a write command directed to a register located at address zero,
wherein data is provided in a third-transmitted bit and subsequently-transmitted bits of the command field to be written to the register located at address zero when a second-transmitted bit of the command field has a first value, and
wherein data is provided in a payload field comprising the data to be written to a register located at an address provided in the third-transmitted bit and the subsequently-transmitted bits of the command field when the second-transmitted bit of the command field has a second value.

18. The apparatus of claim 17, wherein the SSC has a width that is different from a width of each pulse that encodes data in the pulse-width modulated datagram.

19. The apparatus of claim 17, wherein the payload field is transmitted after the command field when the second-transmitted bit of the command field has the second value, and wherein the payload field comprises one or more bytes of data.

20. The apparatus of claim 17, wherein the means for providing fields in the pulse-width modulated datagram is configured to:
provide a slave address in the pulse-width modulated datagram, the slave address selecting one or more of a plurality of slave devices coupled to the data wire to receive the pulse-width modulated datagram.

21. The apparatus of claim 20, further comprising:
means for providing a power supply to the plurality of slave devices.

22. The apparatus of claim 17, further comprising:
means for reconfiguring the datalink for communication according to a Radio Frequency Front-End (RFFE) protocol; and
means for transmitting an RFFE datagram on the data wire of the datalink in accordance with timing provided by a clock signal transmitted on a clock line of the datalink.

23. The apparatus of claim 22, wherein the means for reconfiguring the datalink for communication according to the RFFE protocol includes:

means for enabling transmission of the clock signal, wherein the transmission of the clock signal is suppressed during the transmission of the pulse-width modulated datagram.

24. A non-transitory processor-readable storage medium comprising code for:
   transmitting a one-bit sequence start condition (SSC) over a data wire of a datalink, the SSC having a first edge that commences transmission of a pulse-width modulated datagram and a second edge that indicates an optimal sampling point in each bit period of the pulse-width modulated datagram;
   providing a command field in the pulse-width modulated datagram, wherein a first-transmitted bit of the command field identifies the pulse-width modulated datagram as a write command directed to a register located at address zero;
   providing data in a third-transmitted bit and subsequently-transmitted bits of the command field to be written to the register located at address zero when a second-transmitted bit of the command field has a first value; and
   providing a payload field comprising data to be written to a register located at an address provided in the third-transmitted bit and the subsequently-transmitted bits of the command field when the second-transmitted bit of the command field has a second value.

25. The storage medium of claim 24, wherein the SSC has a width that is different from a width of each pulse that encodes data in the pulse-width modulated datagram.

26. The storage medium of claim 24, wherein the payload field is transmitted after the command field when the second-transmitted bit of the command field has the second value, and wherein the payload field comprises one or more bytes of data.

27. The storage medium of claim 24, further comprising code for:
   providing a slave address in the pulse-width modulated datagram, the slave address selecting one or more of a plurality of slave devices coupled to the data wire to receive the pulse-width modulated datagram.

28. The storage medium of claim 27, further comprising code for:
   providing a power supply to the plurality of slave devices.

29. The storage medium of claim 24, further comprising code for:
   reconfiguring the datalink for communication according to a Radio Frequency Front-End (RFFE) protocol; and
   transmitting an RFFE datagram on the data wire of the datalink in accordance with timing provided by a clock signal transmitted on a clock line of the datalink.

30. The storage medium of claim 29, wherein reconfiguring the datalink comprises:
   enabling transmission of the clock signal, wherein the transmission of the clock signal is suppressed during the transmission of the pulse-width modulated datagram.

* * * * *